United States Patent
Bang

(10) Patent No.: US 10,303,351 B2
(45) Date of Patent: May 28, 2019

(54) METHOD AND APPARATUS FOR NOTIFYING OF CONTENT CHANGE

(71) Applicant: Samsung Electronics Co., Ltd., Gyeonggi-do (KR)

(72) Inventor: Kwangmin Bang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 743 days.

(21) Appl. No.: 14/925,926

(22) Filed: Oct. 28, 2015

(65) Prior Publication Data

US 2016/0117091 A1   Apr. 28, 2016

(30) Foreign Application Priority Data

Oct. 28, 2014 (KR) .................. 10-2014-0147757

(51) Int. Cl.
| | | |
|---|---|---|
| *G06F 3/0484* | (2013.01) | |
| *G06F 3/0488* | (2013.01) | |
| *G06F 3/0481* | (2013.01) | |
| *G09G 5/00* | (2006.01) | |
| *G06F 3/0483* | (2013.01) | |
| *G06F 16/957* | (2019.01) | |

(52) U.S. Cl.
CPC ........ *G06F 3/04847* (2013.01); *G06F 3/0481* (2013.01); *G06F 3/0483* (2013.01); *G06F 3/0488* (2013.01); *G06F 16/957* (2019.01); *G09G 5/00* (2013.01); *G09G 2340/14* (2013.01); *G09G 2340/145* (2013.01)

(58) Field of Classification Search
CPC ..... G06F 17/30899; G06F 2203/04806; G06F 3/0481; G06F 3/04842; G06F 3/04847; G06F 3/0488; G09G 2340/14; G09G 2340/145; G09G 5/00
See application file for complete search history.

(56) References Cited

U.S. PATENT DOCUMENTS 8,589,818 B1 * 11/2013 Jones .................. G09B 29/106
                                                    715/781
2006/0136839 A1   6/2006 Makela
2008/0276248 A1  11/2008 Xu et al.
(Continued)

FOREIGN PATENT DOCUMENTS

WO   WO 2006/067620 A2   6/2006

OTHER PUBLICATIONS

International Search Report dated Mar. 31, 2016 in connection with International Application No. PCT/KR2015/011320, 3 pages.
(Continued)

*Primary Examiner* — Andrea N Long

(57) ABSTRACT

Disclosed are a method and an apparatus for notifying of a content change. The apparatus includes: at least one display; a processor electrically connected to the display; and a memory, wherein the memory includes instructions for allowing an electronic device to display at least a part of contents on the display, to execute at least one item, which is related to the content and configured to be displayed in a first area of the contents, and to display the at least one executed item in a second area different from the first area of the display or display information for receiving or guiding a user input to display the at least one item when the instructions are executed.

26 Claims, 25 Drawing Sheets

(56) References Cited

U.S. PATENT DOCUMENTS

| | | | |
|---|---|---|---|
| 2010/0035657 A1* | 2/2010 | Blenessy | G06F 17/30893 |
| | | | 455/566 |
| 2010/0259562 A1 | 10/2010 | Miyazawa et al. | |
| 2010/0269152 A1* | 10/2010 | Pahlavan | H04L 63/08 |
| | | | 726/3 |
| 2011/0191669 A1 | 8/2011 | Yang et al. | |
| 2013/0167075 A1* | 6/2013 | Chanda | G06F 3/0481 |
| | | | 715/800 |
| 2013/0254659 A1* | 9/2013 | Bedingfield, Sr. | G06F 3/0485 |
| | | | 715/273 |
| 2013/0297206 A1 | 11/2013 | Heng et al. | |
| 2014/0028702 A1 | 1/2014 | Liang et al. | |
| 2014/0040721 A1* | 2/2014 | Brownlow | G06F 17/24 |
| | | | 715/234 |
| 2014/0181636 A1 | 6/2014 | Abuelsaad et al. | |
| 2015/0012843 A1* | 1/2015 | Ouyang | H04L 65/403 |
| | | | 715/753 |

OTHER PUBLICATIONS

Extended European Search Report dated Mar. 21, 2016 in connection with European Application No. 15191266.4, 7 pages.

* cited by examiner

OVERSEAS HOTEL    DOMESTIC HOTEL

FIND DESTINATION (CITY/HOTEL)

FIND MAIN CITY/HOTEL

SELECT DATE

NUMBER OF ROOMS

ONE ROOM

910

| < | AUGUST, 2014 | > |
|---|---|---|

| SUN | MON | TUE | WED | THU | FRI | SAT |
|-----|-----|-----|-----|-----|-----|-----|
|     |     |     |     |     | 1   | 2   |
| 3   | 4   | 5   | 6   | 7   | 8   | 9   |
| 10  | 11  | 12  | 13  | 14  | 15  | 16  |
| 17  | 18  | 19  | 20  | 21  | 22  | 23  |
| 24  | 25  | 26  | 27  | 28  | 29  | 30  |
| 31  |     |     |     |     |     |     |

DETAILED SEAR

HOTEL SE

METHOD AND APPARATUS FOR NOTIFYING OF CONTENT CHANGE

CROSS-REFERENCE TO RELATED APPLICATION AND CLAIM OF PRIORITY

The present application is related to and claims benefit under 35 U.S.C. § 119(a) of Korean Patent Application No. 10-2014-0147757, filed on Oct. 28, 2014, which is hereby incorporated by reference for all purposes as if fully set forth herein.

TECHNICAL FIELD

The present disclosure relates generally to a method of notifying a user of a changed part of a page.

BACKGROUND

On the strength of the remarkable development of information communication technologies and semiconductor technologies, the supply and use of electronic devices have rapidly increased. The electronic device initially provided a primary service such as a voice call or a Short Message Service (SMS), but recently provides a wireless Internet environment as well as photography, way-finding, and payment, thereby providing more various services.

Since the electronic device is manufactured to be light and small to be easily grasped by the hand, the electronic device has a small screen. In general, when the electronic device makes a request for a webpage to a web server, the web server may provide a webpage of a mobile version which fits the size of the small screen of the electronic device. Alternatively, when the electronic device displays a webpage of a PC version, the electronic device may enlarge some areas of the webpage according to a user's selection.

SUMMARY

An electronic device may install an application according to each web server in order to display a webpage of a mobile version. However, if the electronic device installs an application for displaying the webpage of the mobile version, the electronic device may use too much storage space for installing the application. Further, since the webpage of the mobile version is re-configured from a webpage of a PC version, the layout of the webpage of the mobile version may be different from that of the webpage of the PC version. Accordingly, the user may prefer the use of the webpage of the PC version rather than the webpage of the mobile version if necessary.

However, when the electronic device displays the webpage of the PC version, the user may have difficulty in identifying information contained in the webpage at once. When the user selects a particular part, which the user desires to view in the webpage, the electronic device may display an enlarged page generated by enlarging the selected area. When the user selects an item in the enlarged page, the electronic device may change the webpage. However, the changed webpage may not be displayed on a display unit of the electronic device. In this case, the user may move the enlarged page in an up, down, left, or right direction to find the changed information. Alternatively, the user may find the changed information by zooming out the enlarged page. When the user has found the detailed information, the user can identify the content included in the detailed information only after zooming in on the detailed information.

To address the above-discussed deficiencies, it is a primary object to provide a method and an apparatus for allowing the user to easily recognize what has changed in an area which is not displayed on the display unit of the electronic device.

Certain embodiments of the present disclosure include an electronic device is provided. The electronic device includes: at least one display; a processor electrically connected to the display; and a memory, wherein the memory may include instructions for allowing the electronic device to display at least a part of contents on the display, to execute at least one item, which is related to the content and configured to be displayed in a first area of the contents, and to display the at least one executed item in a second area different from the first area of the display or display information for receiving or guiding a user input to display the at least one item when the instructions are executed.

Certain embodiments of the present disclosure include a method of notifying of a content change by an electronic device is provided. The method includes: displaying at least a part of contents on a display; receiving a user input for displaying at least one item related to the contents; executing at least one item, which is related to the contents and configured to be displayed in a first area of the contents in response to the user input; and displaying the at least one executed item in a second area different from the first area of the display or display information for receiving or guiding a user input to display the at least one item.

According to an embodiment, an electronic device displays a notification for notifying that there is changed information in an area, which is not displayed on a display of the electronic device, so that a user can easily identify what has changed.

According to an embodiment, when changed information of the contents is not displayed on the display unit, the electronic device may automatically display the changed information on the display unit according to a setting of the electronic device without requiring the user to repeatedly zoom in/out and to find with their eyes what part of the contents has changed.

According to an embodiment, when at least one item is displayed, the electronic device may generate a new window and display the new window on the contents in the fawn of a popup window.

According to an embodiment, it is possible to increase user's convenience by providing a control key for returning to an originally displayed screen or by providing the control key for returning through an interworking with a hardware key of the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A to 8D illustrate an example of returning to a previous page according to an embodiment of the present disclosure;

FIGS. 9A and 9B illustrate an example of automatically displaying one or more items according to various embodiments of the present disclosure;

DETAILED DESCRIPTION

Figure 1:
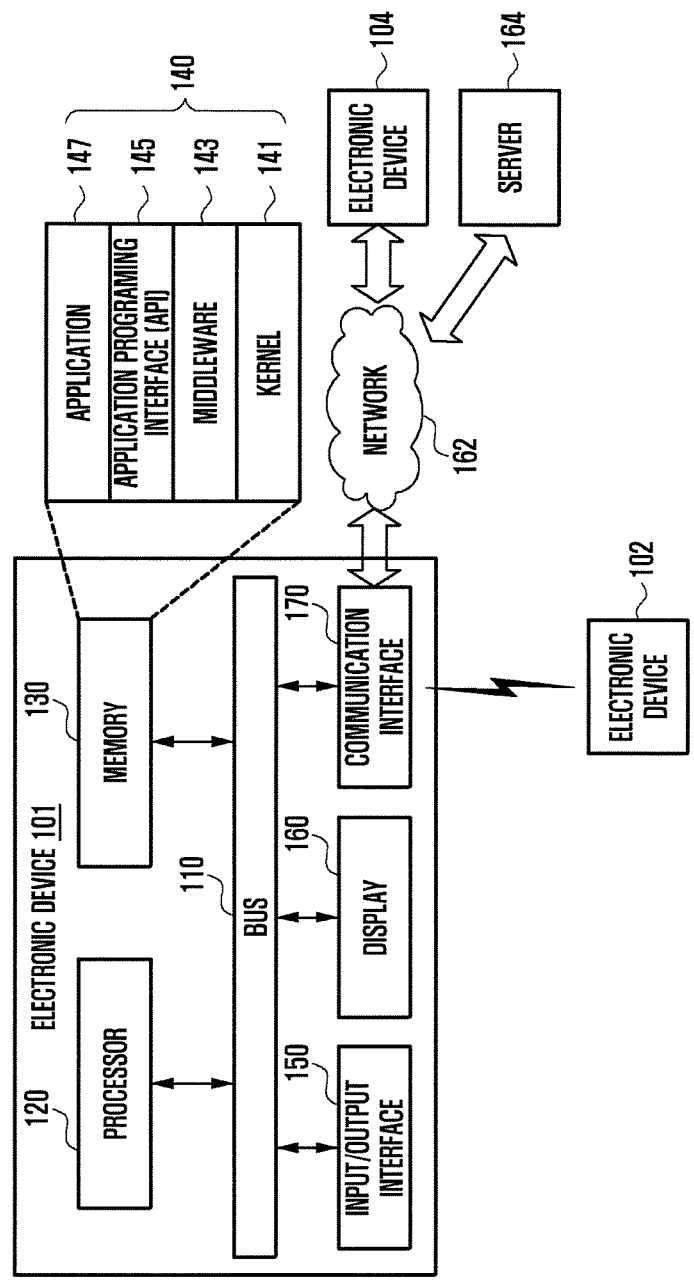
FIG. 1 illustrates an electronic device within a network environment according to various embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a TeleVision (TV), a Digital Video Disk (DVD) player, an audio device, various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

FIG. 1 illustrates a configuration of an electronic device according to an embodiment of the present disclosure.

Referring to FIG. 1, the electronic device 101 may include a bus 110, a processor 120, a memory 130, a user input module 140, a display module 150, a communication module 160, and other similar and/or suitable components.

The bus 110 may be a circuit which interconnects the above-described elements and delivers a communication (e.g., a control message) between the above-described elements.

The processor 120 may receive commands from the above-described other elements (e.g., the memory 130, the user input module 140, the display module 150, the communication module 160, etc.) through the bus 110, may interpret the received commands, and may execute calculation or data processing according to the interpreted commands.

The memory 130 may store commands or data received from the processor 120 or other elements (e.g., the user input module 140, the display module 150, the communication module 160, etc.) or generated by the processor 120 or the other elements. The memory 130 may include programming modules 131, such as a kernel 141, middleware 143, an Application Programming Interface (API) 145, an application 147, and the like. Each of the above-described programming modules may be implemented in software, firmware, hardware, or a combination of two or more thereof.

The kernel 141 may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 can be used, to at least one of the one or more applications 147.

The API 145 is an interface through which the application 147 is capable of controlling a function provided by the kernel 141 or the middleware 143, and may include, for example, at least one interface or function for file control, window control, image processing, character control, or the like.

The user input module 140, for example, may receive a command or data as input from a user, and may deliver the received command or data to the processor 120 or the memory 130 through the bus 110. The display module 150 may display a video, an image, data, or the like to the user.

The communication module 160 may connect communication between another electronic device 102 and the electronic device 101. The communication module 160 may support a predetermined short-range communication protocol (e.g., Wi-Fi, BlueTooth (BT), and Near Field Communication (NFC)), or predetermined network communication 162 (e.g., the Internet, a Local Area Network (LAN), a Wide Area Network (WAN), a telecommunication network, a cellular network, a satellite network, a Plain Old Telephone Service (POTS), or the like). Each of the electronic devices 102 and 104 may be a device which is identical (e.g., of an identical type) to or different (e.g., of a different type) from the electronic device 101. Further, the communication module 160 may connect communication between a server 164 and the electronic device 101 via the network 162.

Figure 2:
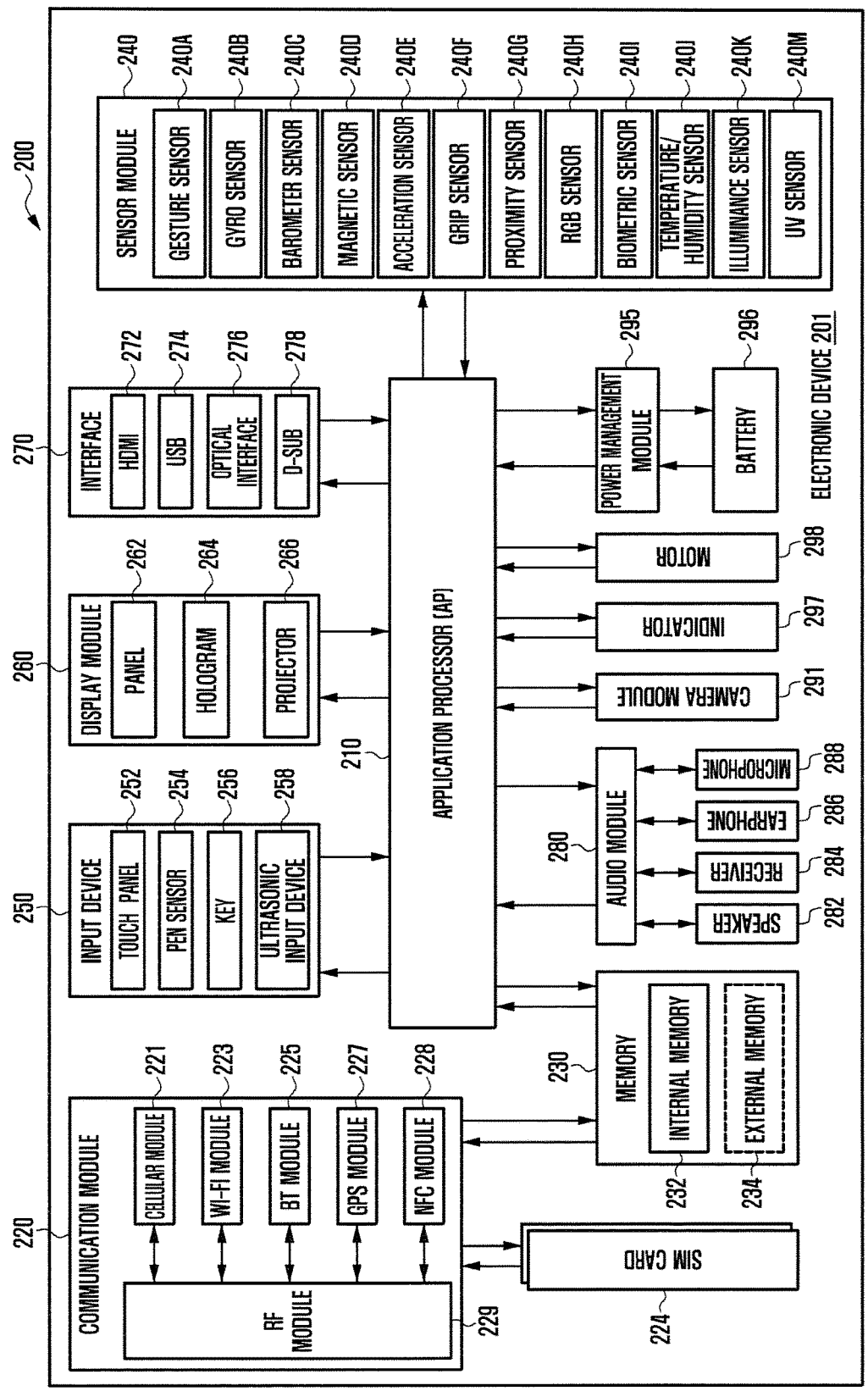
FIG. 2 illustrates a block diagram of an electronic device according to various embodiments of the present disclosure.

FIG. 2 illustrates a configuration of hardware 200 according to an embodiment of the present disclosure.

The hardware 200 may be, for example, the electronic device 101 illustrated in FIG. 1.

Referring to FIG. 2, the hardware 200 may include one or more processors 210, a Subscriber Identification Module (SIM) card 229, a memory 230, a communication module 220, a sensor module 240, a user input module 250, a display module 260, an interface 270, an audio coder/decoder (codec) 280, a camera module 291, a power management module 295, a battery 296, an indicator 297, a motor 298 and any other similar and/or suitable components.

The processor 210 (e.g., the processor 120) may include one or more Application Processors (APs) 211, or one or more Communication Processors (CPs) 213. The processor 210 may be, for example, the processor 120 illustrated in FIG. 1. The AP 211 and the CP 213 are illustrated as being included in the processor 210 in FIG. 2, but may be included in different Integrated Circuit (IC) packages, respectively. According to an embodiment of the present disclosure, the AP 211 and the CP 213 may be included in one IC package.

The AP 211 may execute an Operating System (OS) or an application program, and thereby may control multiple hardware or software elements connected to the AP 211 and may perform processing of and arithmetic operations on various data including multimedia data. The AP 211 may be implemented by, for example, a System on Chip (SoC). According to an embodiment of the present disclosure, the processor 210 may further include a Graphical Processing Unit (GPU) (not illustrated).

The CP 213 may manage a data line and may convert a communication protocol in the case of communication between the electronic device (e.g., the electronic device 101) including the hardware 200 and different electronic devices connected to the electronic device through the network. The CP 213 may be implemented by, for example, a SoC. According to an embodiment of the present disclosure, the CP 213 may perform at least some of multimedia control functions. The CP 213, for example, may distinguish and authenticate a terminal in a communication network by using a subscriber identification module (e.g., the SIM card 229). Also, the CP 213 may provide the user with services, such as a voice telephony call, a video telephony call, a text message, packet data, and the like.

Further, the CP 213 may control the transmission and reception of data by the communication module 220. In FIG. 2, the elements such as the CP 213, the power management module 295, the memory 230, and the like are illustrated as elements separate from the AP 211. However, according to an embodiment of the present disclosure, the AP 211 may include at least some (e.g., the CP 213) of the above-described elements.

According to an embodiment of the present disclosure, the AP 211 or the CP 213 may load, to a volatile memory, a command or data received from at least one of a non-volatile memory and other elements connected to each of the AP 211 and the CP 213, and may process the loaded command or data. Also, the AP 211 or the CP 213 may store, in a non-volatile memory, data received from or generated by at least one of the other elements.

The SIM card 229 may be a card implementing a subscriber identification module, and may be inserted into a slot formed in a particular portion of the electronic device 101.

The SIM card 229 may include unique identification information (e.g., Integrated Circuit Card IDentifier (ICCID)) or subscriber information (e.g., International Mobile Subscriber Identity (IMSI)).

The memory 230 may include an internal memory 232 and an external memory 229. The memory 230 may be, for example, the memory 130 illustrated in FIG. 1. The internal memory 232 may include, for example, at least one of a volatile memory (e.g., a Dynamic RAM (DRAM), a Static RAM (SRAM), a Synchronous Dynamic RAM (SDRAM), etc.), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, etc.). According to an embodiment of the present disclosure, the internal memory 232 may be in the form of a Solid State Drive (SSD). The external memory 229 may further include a flash drive, for example, a Compact Flash (CF), a Secure Digital (SD), a Micro-Secure Digital (Micro-SD), a Mini-Secure Digital (Mini-SD), an extreme Digital (xD), a memory stick, or the like.

The communication module 220 may include a wireless communication module 221 or a Radio Frequency (RF) module 229. The communication module 220 may be, for example, the communication module 160 illustrated in FIG. 1. The wireless communication module 221 may include, for example, a Wi-Fi part 223, a BT part 225, a GPS part 227, or a NFC part 228. For example, the wireless communication module 221 may provide a wireless communication function by using a radio frequency. Additionally or alternatively, the wireless communication module 221 may include a network interface (e.g., a LAN card), a modulator/demodulator (modem), or the like for connecting the hardware 200 to a network (e.g., the Internet, a LAN, a WAN, a telecommunication network, a cellular network, a satellite network, a POTS, or the like).

The RF module 229 may be used for transmission and reception of data, for example, transmission and reception of RF signals or called electronic signals. Although not illustrated, the RF unit 229 may include, for example, a transceiver, a Power Amplifier Module (PAM), a frequency filter, a Low Noise Amplifier (LNA), or the like. Also, the RF module 229 may further include a component for transmitting and receiving electromagnetic waves in a free space in a wireless communication, for example, a conductor, a conductive wire, or the like.

The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red, Green and Blue (RGB) sensor 240H, a biometric sensor 240I, a temperature/humidity sensor 240J, an illuminance sensor 240K, and a Ultra Violet (UV) sensor 240M. The sensor module 240 may measure a physical quantity or may sense an operating state of the electronic device 101, and may convert the measured or sensed information to an electrical signal. Additionally/alternatively, the sensor module 240 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein.

The user input module 250 may include a touch panel 252, a pen sensor 254 (e.g., a digital pen sensor), keys 256, and an ultrasonic input unit 258. The user input module 250 may be, for example, the user input module 140 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of wireless recognition. According to an embodiment of the present disclosure, the hardware 200 may receive a user input from an external device (e.g., a network, a computer, or a server), which is connected to the communication module 220, through the communication module 220.

The display module 260 may include a panel 262, a hologram 264, or a projector 266. The display module 260 may be, for example, the display module 150 illustrated in FIG. 1. The panel 262 may be, for example, a Liquid Crystal Display (LCD) and an Active Matrix Organic Light Emitting Diode (AM-OLED) display, and the like. The panel 262 may be implemented so as to be, for example, flexible, transparent, or wearable. The panel 262 may include the touch panel 252 and one module. The hologram 264 may display a three-dimensional image in the air by using interference of light. According to an embodiment of the present disclosure, the display module 260 may further include a control circuit for controlling the panel 262 or the hologram 264.

The interface 270 may include, for example, a High-Definition Multimedia Interface (HDMI) 272, a Universal Serial Bus (USB) 274, an optical interface 276, and a D-subminiature (D-sub) 278. Additionally or alternatively, the interface 270 may include, for example, SD/Multi-Media Card (MMC) (not illustrated) or Infrared Data Association (IrDA) (not illustrated).

The audio codec 280 may bidirectionally convert between a voice and an electrical signal. The audio codec 280 may convert voice information, which is input to or output from the audio codec 280, through, for example, a speaker 282, a receiver 284, an earphone 286, the microphone 288 or the like.

The camera module 291 may capture an image and a moving image. According to an embodiment, the camera module 291 may include one or more image sensors (e.g., a front lens or a back lens), an Image Signal Processor (ISP) (not illustrated), and a flash LED (not illustrated).

The power management module 295 may manage power of the hardware 200. Although not illustrated, the power management module 295 may include, for example, a Power Management Integrated Circuit (PMIC), a charger Integrated Circuit (IC), or a battery fuel gauge.

The PMIC may be mounted to, for example, an IC or a SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the hardware 200 or a part (e.g., the AP 211) of the hardware 200, for example, a booting state, a message state, a charging state and the like. The motor 298 may convert an electrical signal into a mechanical vibration. The processor 210 may control the sensor module 240.

Although not illustrated, the hardware 200 may include a processing unit (e.g., a GPU) for supporting a module TV. The processing unit for supporting a module TV may process media data according to standards such as, for example, Digital Multimedia Broadcasting (DMB), Digital Video Broadcasting (DVB), media flow, and the like. Each of the above-described elements of the hardware 200 according to an embodiment of the present disclosure may include one or more components, and the name of the relevant element may change depending on the type of electronic device. The hardware 200 according to an embodiment of the present disclosure may include at least one of the above-described elements. Some of the above-described elements may be omitted from the hardware 200, or the hardware 200 may further include additional elements. Also, some of the elements of the hardware 200 according to an embodiment of the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an Application-Specific Integrated Circuit (ASIC) chip, a Field-Programmable Gate Array (FPGA), and a programmable-logic device for performing certain operations.

Figure 3:
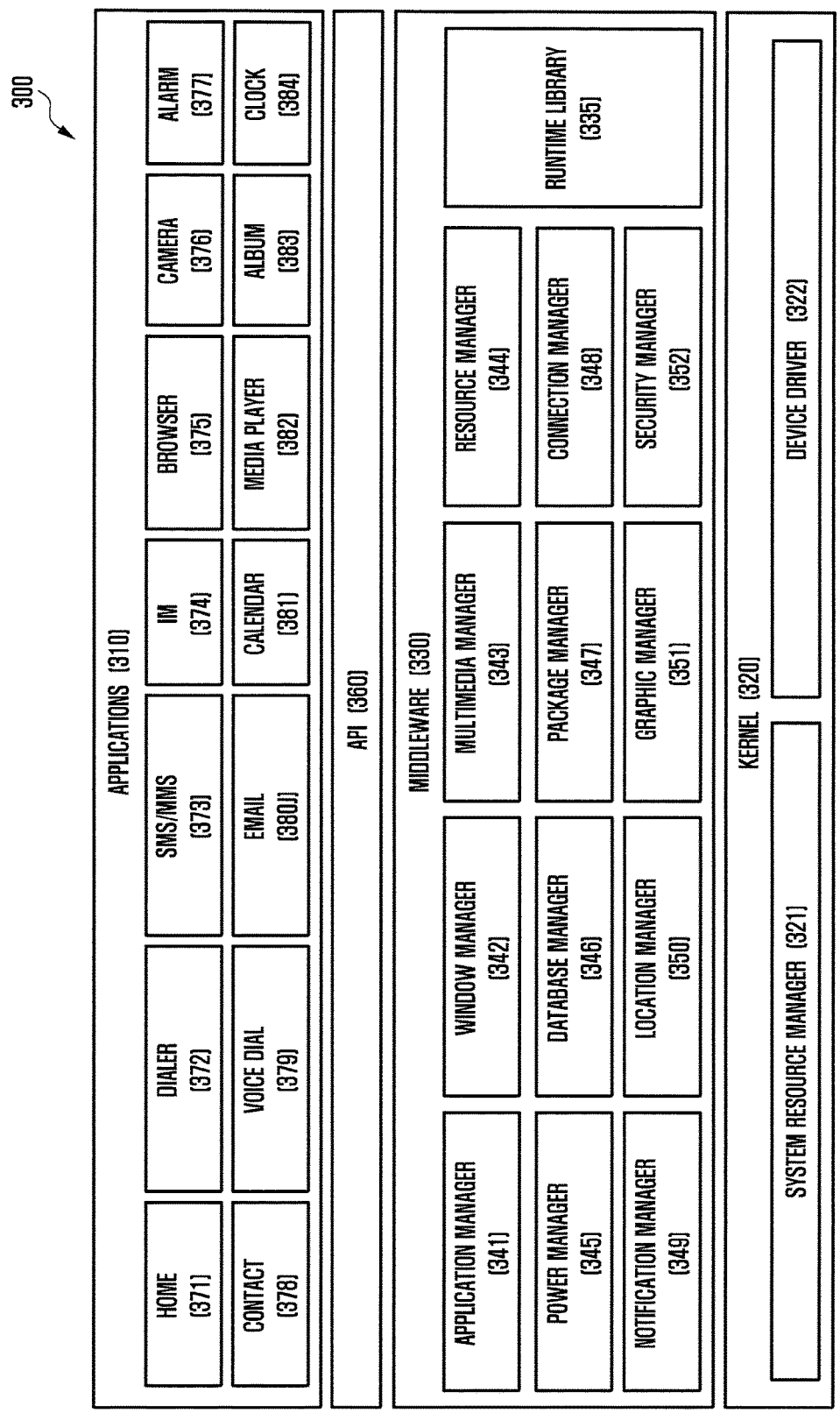
FIG. 3 illustrates a block diagram of a program module according to various embodiments of the present disclosure.

FIG. 3 illustrates a configuration of a programming module 300 according to an embodiment of the present disclosure.

The programming module 300 may be included (or stored) in the electronic device 101 (e.g., the memory 130) or may be included (or stored) in the electronic device 201 (e.g., the memory 289) illustrated in FIG. 1. At least a part of the programming module 300 may be implemented in software, firmware, hardware, or a combination of two or more thereof. The programming module 300 may be implemented in hardware (e.g., the hardware 200), and may include an OS controlling resources related to an electronic device (e.g., the electronic device 101) and/or various applications (e.g., an application 310) executed in the OS. For example, the OS may be Android, iOS, Windows, Symbian, Tizen, Bada, and the like.

Referring to FIG. 3, the programming module 300 may include a kernel 320, a middleware 330, an API 360, and/or the application 310.

The kernel 320 (e.g., the kernel 141) may include a system resource manager 321 and/or a device driver 322. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 322 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 322 may include an Inter-Process Communication (IPC) driver (not illustrated).

The middleware 330 may include multiple modules previously implemented so as to provide a function used in common by the applications 310. Also, the middleware 330 may provide a function to the applications 310 through the API 360 in order to enable the applications 310 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 310. According to an embodiment of the present disclosure, the runtime library 335 may perform functions which are related to input and output, the management of a memory, an arithmetic function, and/or the like.

The application manager 341 may manage, for example, a life cycle of at least one of the applications 310. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 310.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 310. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 310 (e.g., the applications 147) may include, for example, a preloaded application and/or a third party application. The applications 310 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 230. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Names of the elements of the programming module (e.g., the programming module 300) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

An electronic device according to various embodiments may include: at least one display; a processor electrically connected to the display; and a memory, wherein the memory may include instructions for allowing the electronic device to display at least a part of contents on the display, to execute at least one item, which is related to the content and configured to be displayed in a first area of the contents, and to display the at least one executed item in a second area different from the first area of the display or to display information for receiving or guiding a user input to display the at least one item when the instructions are executed.

The contents may include a webpage.

The item may be displayed within a popup window.

At least a part of the first area may not be displayed on the display while the part of the contents is displayed on the display.

The information for receiving or guiding the user input to display the at least one item may overlap the displayed part of the contents on the display.

The at least one display may include a first display and a second display, and the instructions may further include instructions for allowing the electronic device to display at least a part of the contents on the first display, to execute at least one item, which is related to the contents and configured to be displayed in a first area of the contents, and to display the at least one executed item in a second area different from the first area of the first or second display or display information for receiving or guiding a user input to display the at least one item.

The electronic device may further include a communication module configured to communicate in a wireless or wired manner with an external electronic device that has a display, wherein the instructions may further include instructions for allowing the electronic device to display at least a part of the contents on the display, to execute at least one item, which is related to the contents and configured to be displayed in a first area of the contents, and to display the at least one executed item in a second area different from the first area of the display of the electronic device and/or the display of the external electronic device or display information for receiving or guiding a user input to display the at least one item.

The guiding information may display on the contents a direction key corresponding to a direction in which the at least one item appears.

The guiding information may distinguish a side of the contents corresponding to a direction in which the item appears from other sides of the contents.

When an area of the at least one item is larger than a reference area of the contents, the processor may generate a control to display the at least one item on all of the contents.

The processor may generate a control to display the at least one item on all of the contents according to a setting of the electronic device.

When an input for selecting the guiding information is received, the processor may generate a control to display the at least one item on all of the contents.

The processor may generate a control to display the at least one item by applying a display ratio of the contents or may control a coordinate value to place the at least one item in the center of the contents.

The processor may generate a control to display a control key for returning to the contents in the at least one item.

Figure 4:
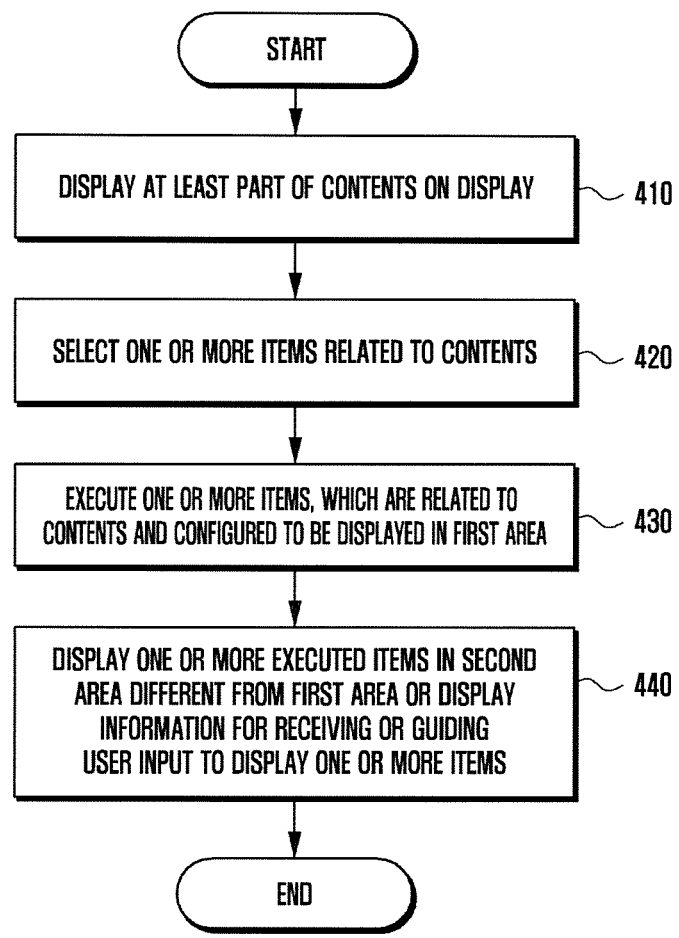
FIG. 4 illustrates a content change notifying method according to various embodiments of the present disclosure.

FIG. 4 illustrates a content change notifying method according to various embodiments. The content change notifying method of FIG. 4 may be performed by the electronic device 101 of FIG. 1 or the electronic device 201 of FIG. 2. Although it will be described hereinafter that the content change notifying method is performed by the electronic device 101 of FIG. 1 for convenience of the description, the electronic device of the present disclosure is not limited to the electronic device 101 of FIG. 1.

Referring to FIGS. 1 to 4, in operation 410, the processor 120 may display at least some of the contents on the display 160. The contents may include, for example, text, images, or dynamic images, which can be displayed on the display 160. The contents may include one or more items in association with the contents.

In operation 420, the processor 120 may receive selection of one or more items in association with the contents through the input/output interface 150. For example, the contents may be a webpage for reserving a hotel, and the one or more items may be for selecting a destination, a date, a room, a room type, and the like. For example, when the user makes a touch for selecting the "date" in the one or more items, the processor 120 may recognize that the date item is selected.

In operation 430, the processor 120 may execute one or more items configured to be displayed in a first area of the contents in response to the selection. Since the date item is selected in operation 420, the processor 120 may configure and execute a "calendar". At this time, the processor 120 may change an attribute associated with the item in the contents. For example, before the "date item" is selected, the attribute of the component for the calendar may be "hidden" in the contents. If the attribute corresponds to "hidden", the calendar is not shown in the contents. However, when the user selects the "date item", the attribute of the component for the calendar may change to "show" in the contents. If the attribute of the calendar corresponds to "show", the calendar may be shown in the contents.

In operation 440, the processor 120 may display the one or more executed items in a second area different from the first area, or display information for receiving or guiding a user input to display the one or more items. For example, the processor 120 may display the one or more executed items in the first area of the contents or in the second area of the contents. When the second area of the contents is displayed in operation 410, the processor 120 may display one or more items, which should be originally displayed in the first area, in the second area. Alternatively, when the second area of the contents is displayed in operation 410, the processor 120 may execute one or more items in the first area as original and, instead, display information for receiving or guiding a user input to display the one or more items in the second area.

The guiding information may be displayed in a partial or entire area of the contents. When the guiding information is displayed in some of the contents, the guiding information may be displayed on the contents in the form of a popup window. Alternatively, the guiding information may indicate a direction in which the one or more items appear. For example, the guiding information may display a direction key corresponding to the direction in which the one or more items appear on the contents. Alternatively, the guiding information may distinguish the side of the contents corresponding to the direction in which the one or more items appear from other sides of the contents.

When the user input for displaying the one or more items is received, the processor 120 may generate a control to display the one or more items in the entire area of the contents. When the one or more items are displayed on the entire area of the display 160, the processor 120 may also display a control key for returning to the contents together with the one or more items. When the user selects the control key, the processor 120 may return to the contents from the item. For example, the user may select a particular date in the calendar displayed as the item. When the selection of the date is completed, the processor 120 may automatically return to the contents.

Alternatively, the processor 120 may perform a function for returning to the contents through an interworking with a hardware key of the electronic device. Alternatively, when a user gesture of shaking the electronic device 101 is recognized, the processor 120 may return to a previous screen. Alternatively, the processor 120 may return to the previous screen by using a gesture of a wearable device (a watch or a ring) paired with the electronic device 101.

According to various embodiments, the processor 120 may display the one or more items in the form of a popup window. For example, the processor 120 may draw the popup window displaying the one or more items to the contents and display the popup window. When the popup window is not completely displayed on the display 160, the processor 120 may display the popup window after resizing the popup window to fit a screen ratio of the display 160.

According to various embodiments, when the area of the one or more items is larger than the reference area of the contents, the processor 120 may generate a control to display the one or more items in the entire area of the contents. For example, when the area of the contents corresponds to 101%, the reference area may correspond to 50%. When the area of the item is larger than the reference area, the processor 120 may determine that the item corresponds to important information and automatically display the item on the display 160. FIGS. 5A to 5D illustrate an example of notifying of a content change according to an embodiment.

Figure 5A:
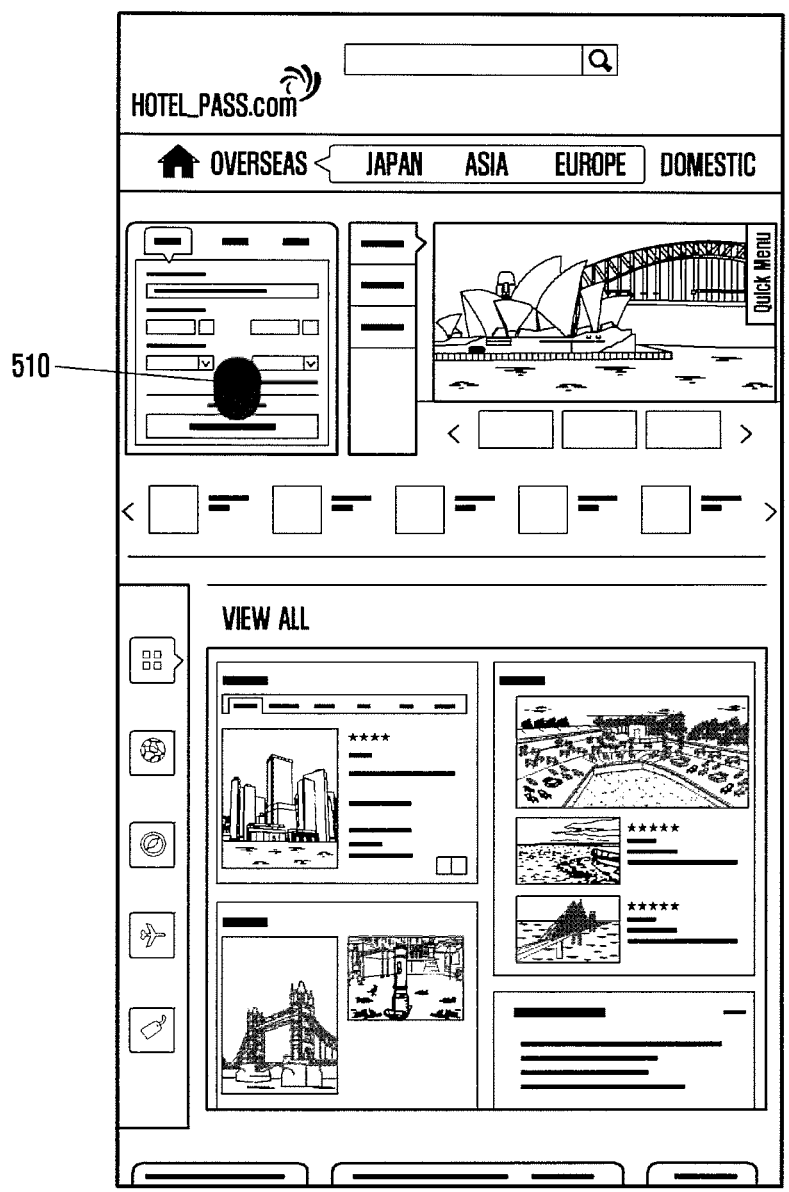
FIGS. 5A to 5D illustrate an example of notifying of a content change according to an embodiment of the present disclosure.

FIG. 5A illustrates an example of displaying a webpage as contents. Referring to FIGS. 1 and 5A, the webpage may be a webpage of a PC version, which is related to a hotel reservation. At this time, the electronic device 101 may be understood as a device such a smart phone that has a screen smaller than a PC monitor. When the webpage of the PC version is displayed on the electronic device 101, the user has difficulty in identifying information contained in the webpage since the screen of the electronic device 101 is small. In this case, the user may select an area which the user desires to enlarge. For example, the user may touch two times in quick succession an area of the webpage for selecting a destination, a date, a room, a room type, and the like. For example, the electronic device 101 may recognize the area that has been touched two times in quick succession as a selected area as indicated by reference numeral 510 and enlarge the selected area.

Figure 5B:
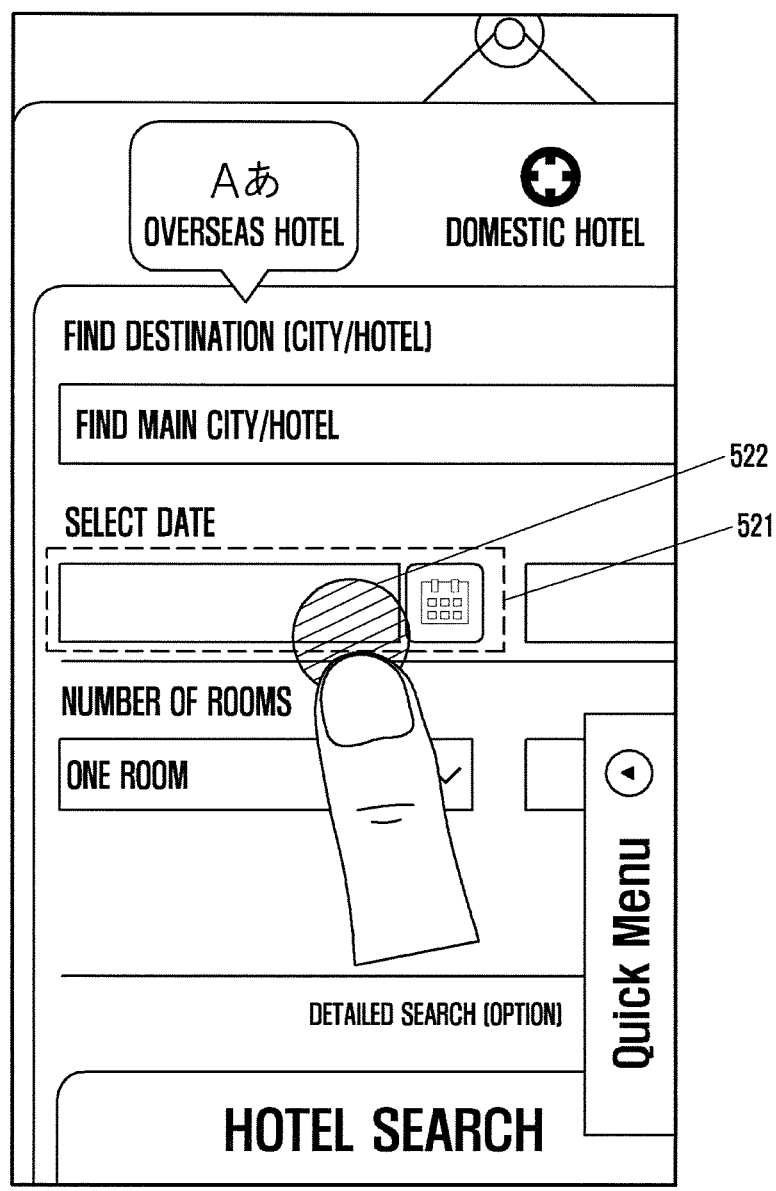

FIG. 5B illustrates a page including the enlarged selected area of the webpage of FIG. 5A. Referring to FIGS. 1 and 5B, it is relatively easier to identify information contained in the enlarged page compared to the webpage of FIG. 5A. When the user touches an item through which the date can be selected in the enlarged page, the processor 120 may recognize that one or more items are selected. Reference numeral 521 may indicate an area in which selection of one or more items is recognized. Reference numeral 522 may correspond to an example of inputting a touch into one point of the area indicated by reference numeral 521.

Figure 5C:
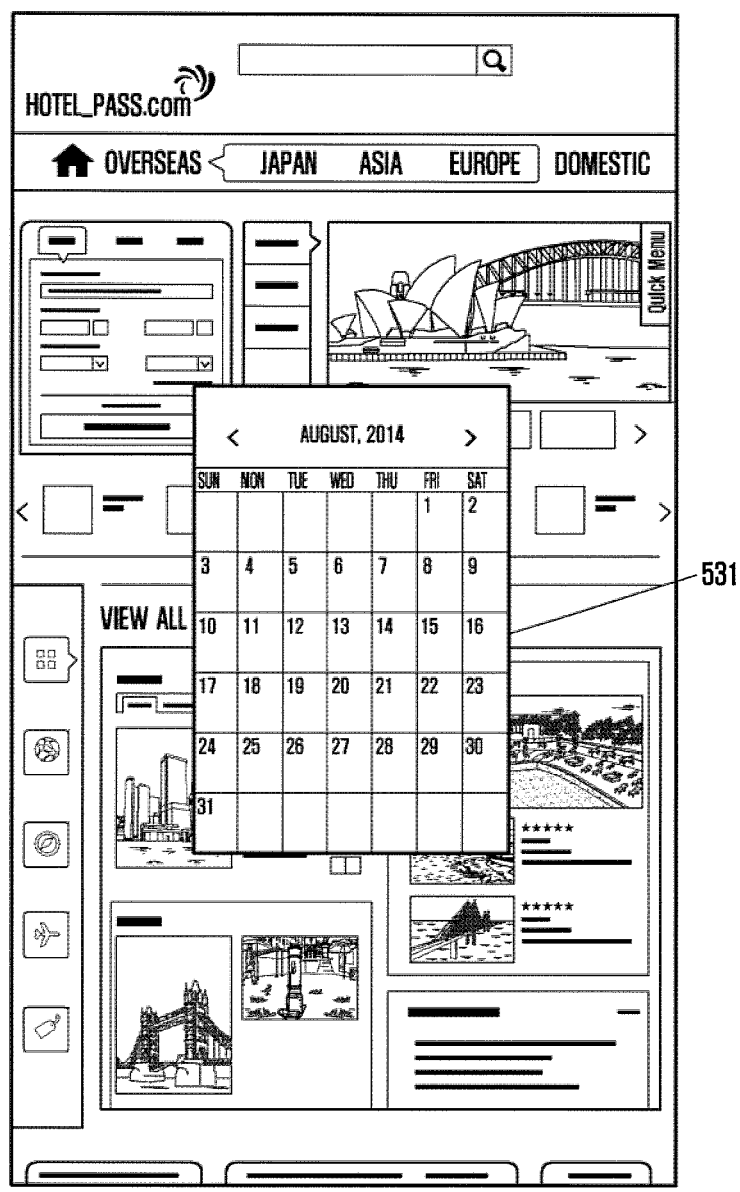

FIG. 5C illustrates a screen displayed in the webpage after the selected item is executed. Referring to FIGS. 1 and 5C, FIG. 5C illustrates a screen displaying a calendar 531 in the webpage after the date item is selected in FIG. 5B. The date item may be associated with the webpage and may be configured to be displayed in the first area of the webpage. However, the date item may not be displayed on the display 160. This is because the enlarged page of FIG. 5B displays the enlarged partial area selected from the webpage. As a result, the date item may not be shown in the enlarged page. In this case, the processor 120 may display guide information indicating that the date item appears in the enlarged page.

Figure 5D:
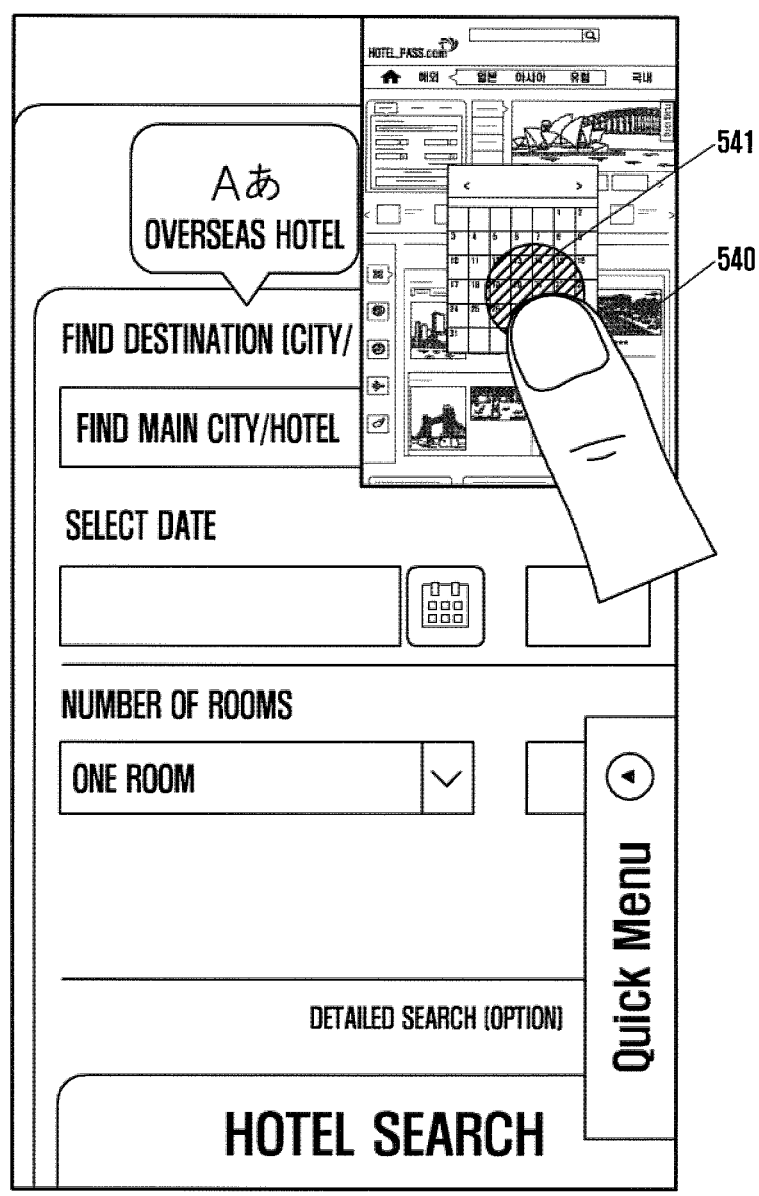

FIG. 5D illustrates guide information indicating that the item appears in the enlarged page of FIG. 5B. Referring to FIGS. 1 and 5D, the processor 120 may overlay a part of the enlarged page with a webpage as indicated by reference numeral 540. The webpage indicated by reference numeral 540 may include a date item as indicated by reference numeral 541. In this case, the date item 541 may be distinguished in the webpage 540. For example, the processor 120 may display an edge of the date item in blue, red, or the like. When the date item 541 or the webpage 540 is selected, the processor 120 may generate a control to display the date item 541 or the webpage 540 in the entire area of the display 160.

Alternatively, when the webpage 540 of FIG. 5D switches to another webpage according to a user's selection, the processor 120 may generate a control to display a webpage, which is different from the currently displayed webpage of FIG. 5A, on the display 160.

According to various embodiments of the present disclosure, even when one or more items are not displayed on the display, guide information indicating that the one or more items appear may be displayed on the display. In this case, the user may easily identify the one or more items through the guide information.

FIGS. 6A to 6D illustrate an example of displaying guide information according to an embodiment.

Figure 6A:
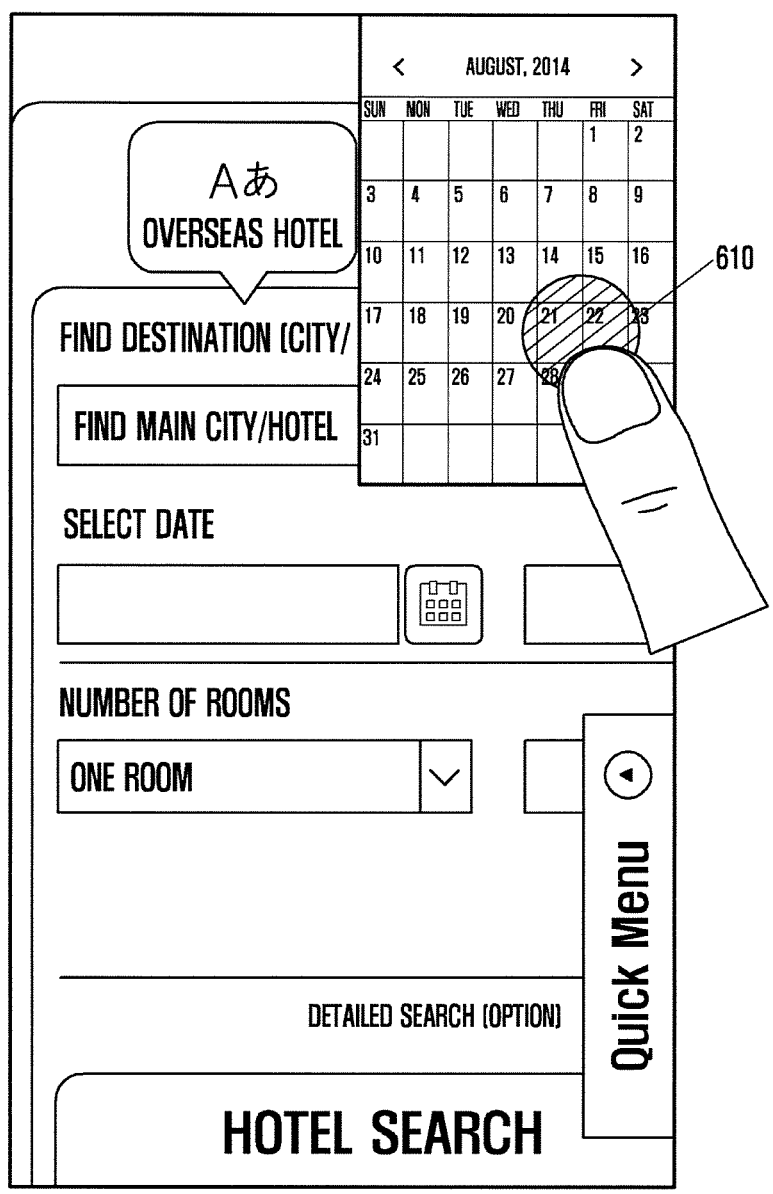
FIGS. 6A to 6D illustrate an example of displaying guide information according to an embodiment of the present disclosure.

FIG. 6A illustrates an example of displaying a date item in a partial area of the enlarged page as guide information. Referring to FIGS. 1 and 6A, the processor 120 may overlay a part of the enlarged page with a date item as indicated by reference numeral 610. The date item 610 may be a "calendar" associated with the date selected in FIG. 5B. The processor 120 may overlay at least a part of the enlarged page with the date item. The processor 120 may display an edge of the date item with a predetermined color (for example, a blue, a red, or the like) or an animation (for example, flickering). In this case, the user may easily identify the date item. When an input for selecting the date item is received from the user, the processor 120 may display the date item in the entire area of the display 160 as illustrated in FIG. 6D.

Figure 6B:
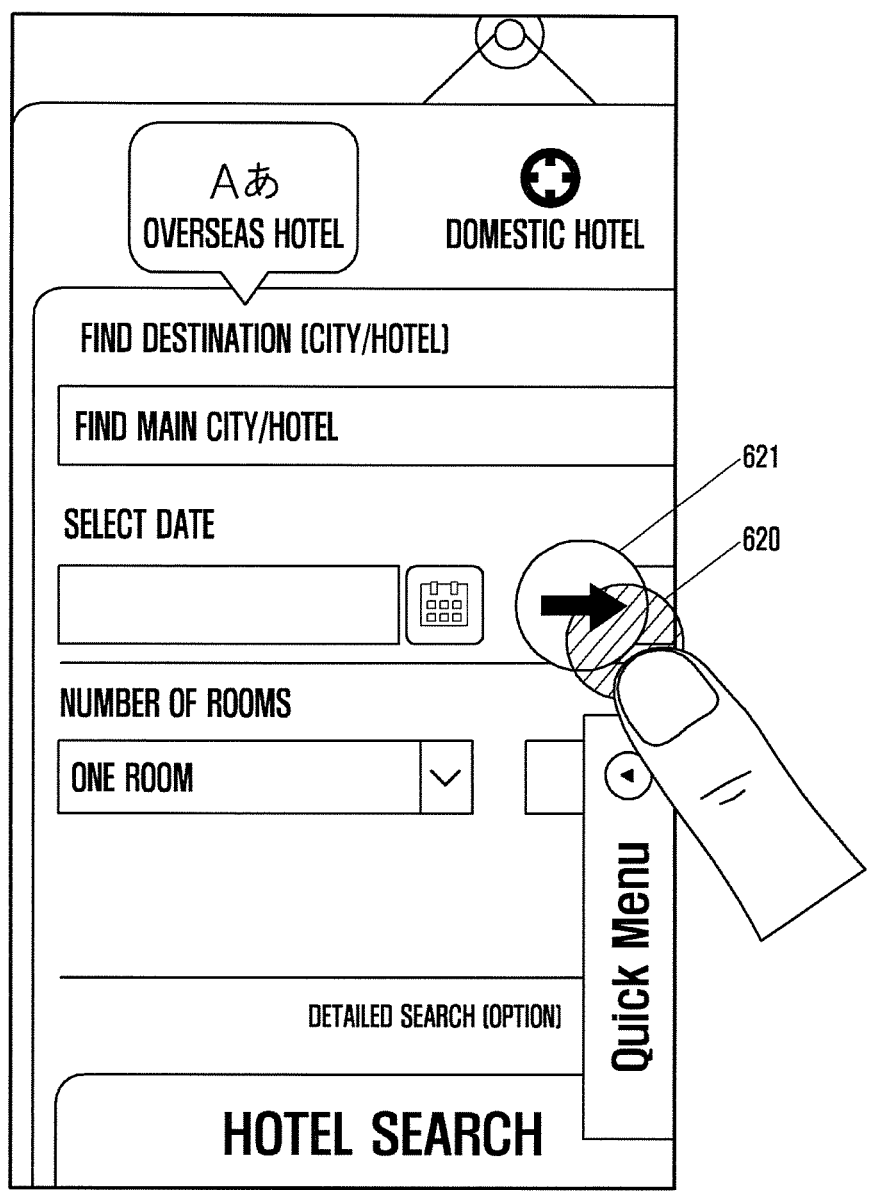

FIG. 6B illustrates an example of displaying as guide information a direction key 621 corresponding to a direction in which the date item appears in the enlarged page. Referring to FIGS. 1 and 6B, the processor 120 may inform of the direction in which the date item appears through the direction key as indicated by reference numeral 621 without directly displaying the date item in the enlarged page. For example, when the date item appears in the left side of the enlarged page, the processor 120 may display a leftwards arrow as the direction key. Alternatively, when the date item appears in the right side of the enlarged page, the processor 120 may display a rightwards arrow as the direction key. Alternatively, when the date item appears in the top side of the enlarged page, the processor 120 may display an upwards arrow as the direction key. Alternatively, when the date item appears in the bottom side of the enlarged page, the processor 120 may display a downwards arrow as the direction key. When an input 620 for selecting the direction key is received from the user, the processor 120 may display the date item in the entire area of the display 160 as illustrated in FIG. 6D.

Figure 6C:
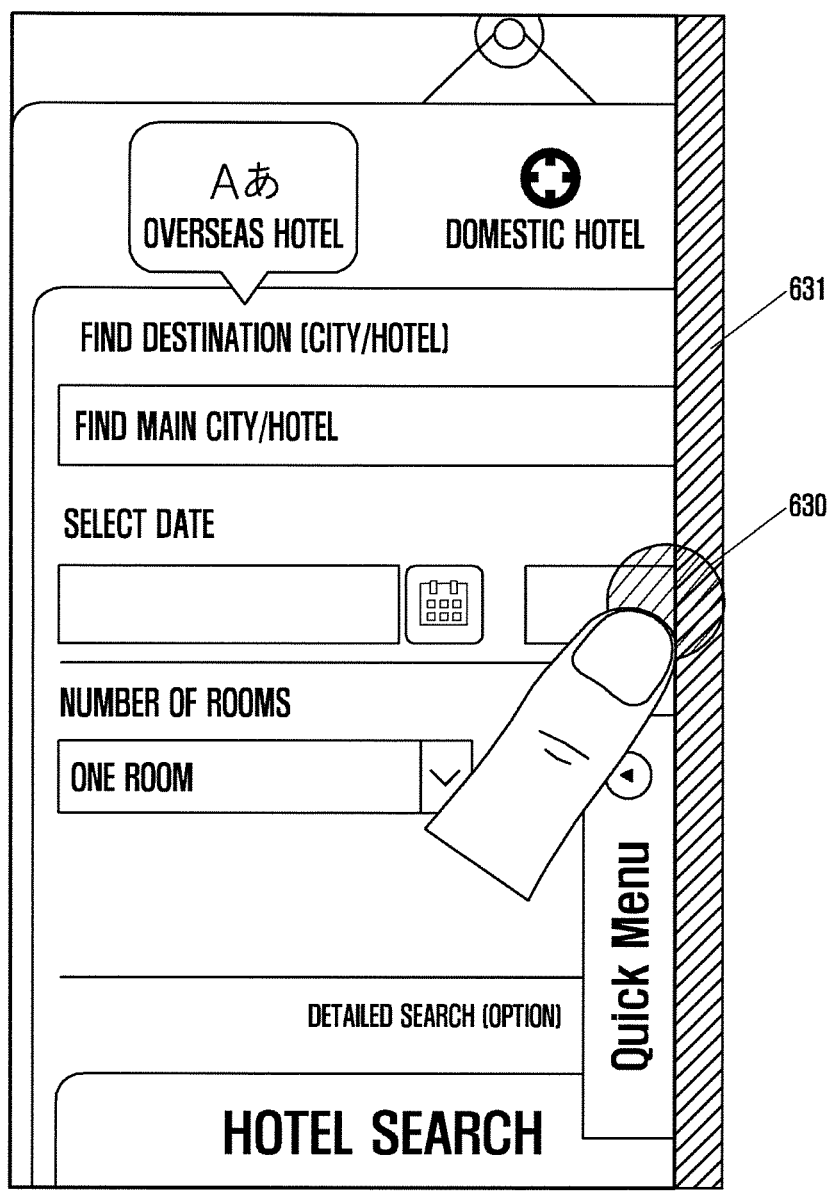

FIG. 6C illustrates an example of guide information in which the side of the enlarged page in which the date item appears is displayed in such a way as to be distinguishable from the other sides. Referring to FIGS. 1 and 6C, the processor 120 may make the right side of the enlarged page indicated by reference numeral 631 flicker in accordance with the direction in which the date item appears or make the right side of the enlarged page distinguishable from the other sides. For example, when the date item appears in the right side of the enlarged page based on the enlarged page, the processor 120 may display the right side of the enlarged page in such a way that it is distinguishable from the other sides. Alternatively, when the date item appears in the left side of the enlarged page, the processor 120 may display the left side of the enlarged page in such a way that it is distinguishable from the other sides. Alternatively, when the date item appears in the top side of the enlarged page, the processor 120 may display the top side of the enlarged page to be distinguished from other sides. Alternatively, when the date item appears in the bottom side of the enlarged page, the processor 120 may display the bottom side of the enlarged page to be distinguished from other sides. When an input 630 for selecting the side distinguished from other sides is received from the user, the processor 120 may display the date item in the entire area of the display 160 as illustrated in FIG. 6D.

Figure 6D:
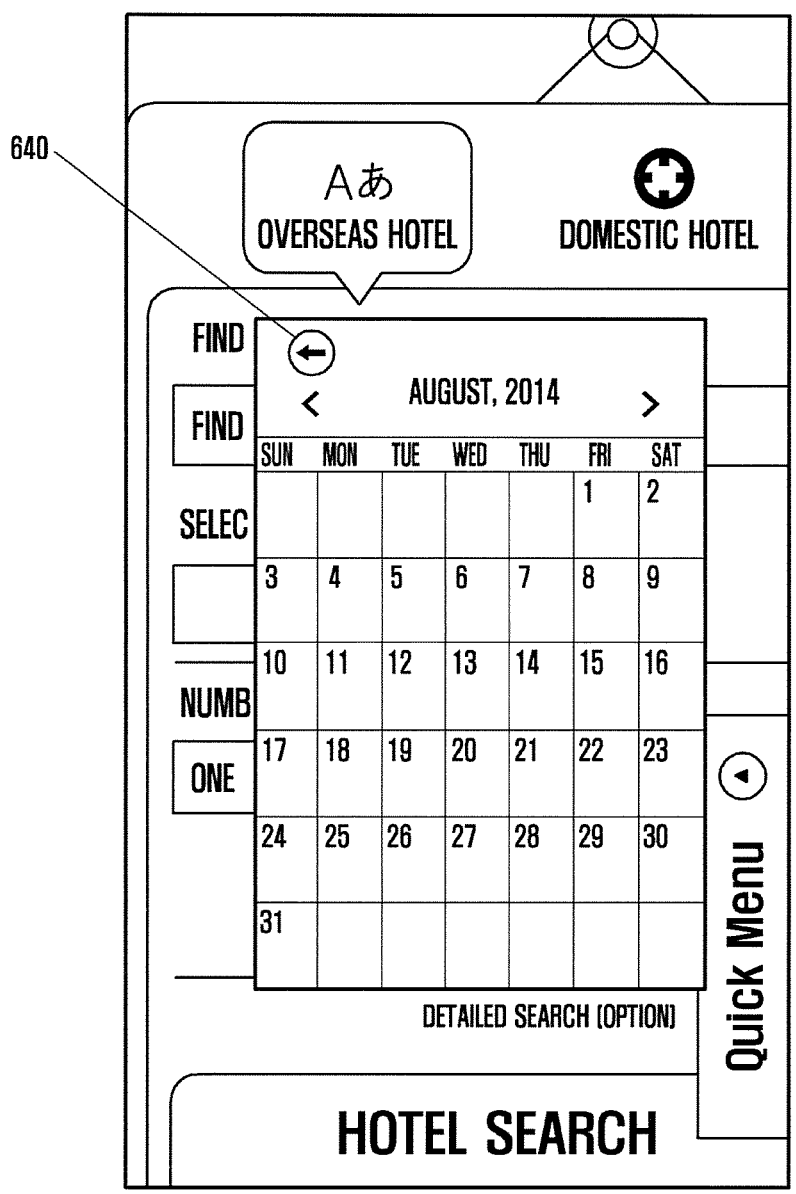

FIG. 6D illustrates an example of displaying the item. Referring to FIGS. 1 and 6D, the processor 120 may display the calendar as the item. The processor 120 may display a control key for returning to the enlarged page in the item. In FIG. 6D, the control key may be indicated by reference numeral 640. When the user selects the control key, the processor 120 may return to the enlarged page and display the enlarged page on the display 160.

Alternatively, a method of controlling the return of the enlarge page may include a returning function through an interworking with a hardware key of the electronic device 101 as well as the method of displaying the control key on the item. For example, the processor 120 may perform the return function through an interworking with a back key of the hardware key of the electronic device 101.

FIGS. 7A to 7D illustrate another example of notifying of a content change according to an embodiment.

Figure 7A:
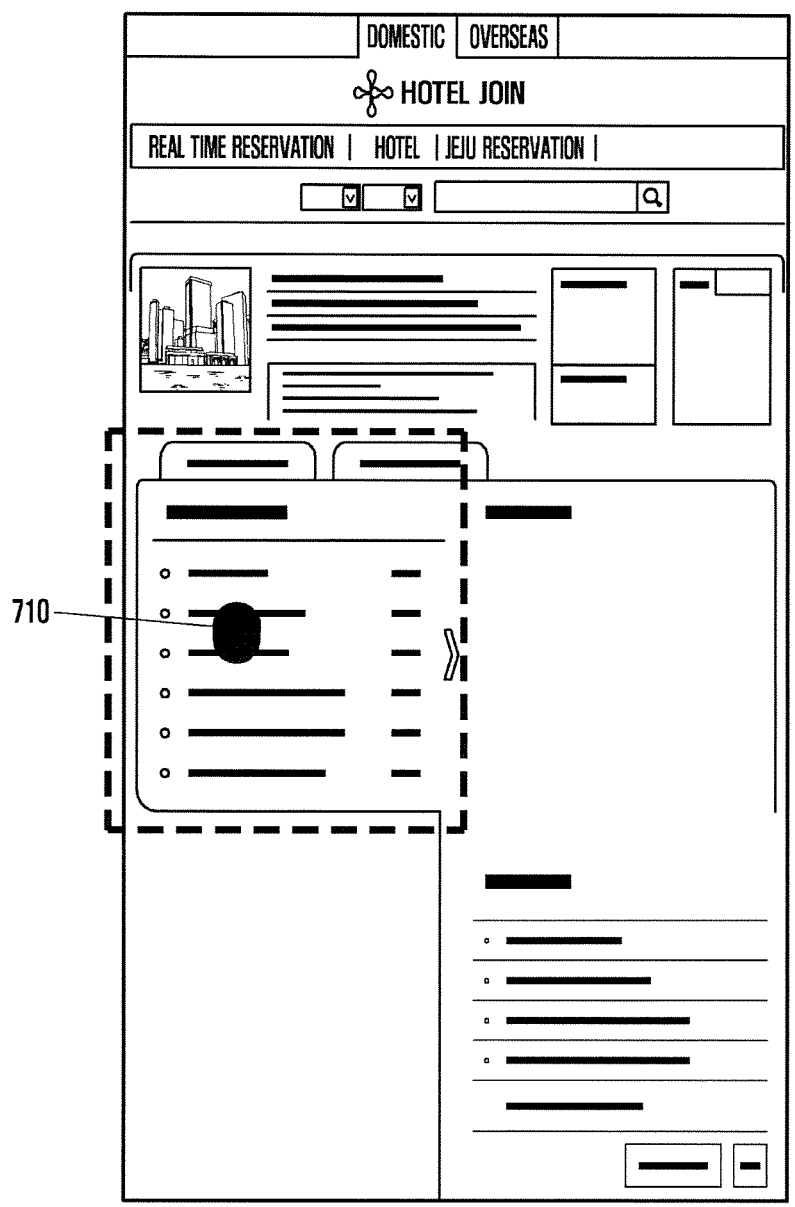
FIGS. 7A to 7D illustrate another example of notifying of a content change according to an embodiment of the present disclosure.

FIG. 7A illustrates the entirety of the webpage as contents. Referring to FIGS. 1 and 7A, the processor 120 may display a webpage different from that of FIG. 5A. The webpage of FIG. 7A may be a webpage of a PC version, which is related to a hotel reservation. For example, the user may touch one area of the webpage successively two times. The processor 120 may recognize the area that has been touched successively two times as a selected area as indicated by reference numeral 710 and enlarge the selected area.

Figure 7B:
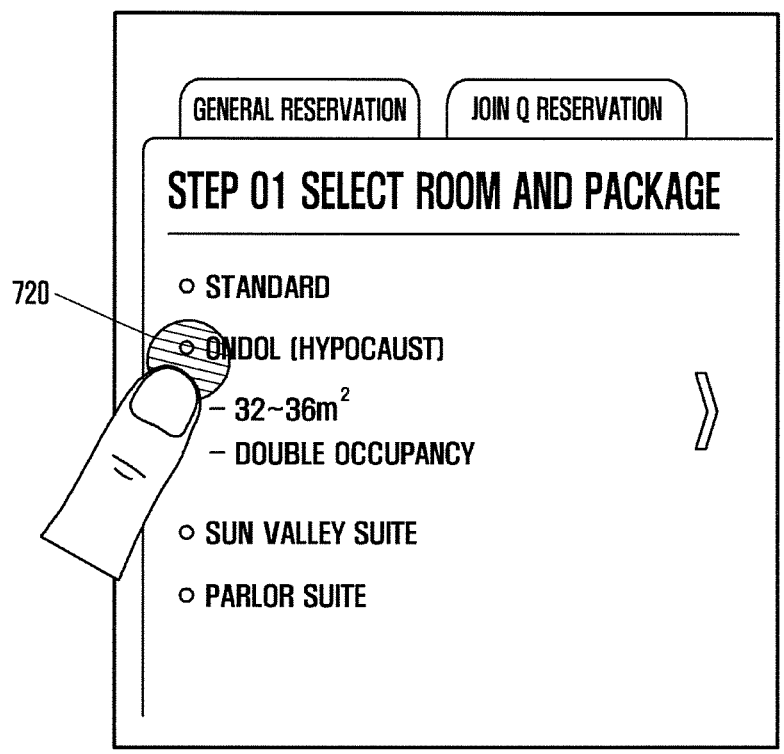

FIG. 7B illustrates a page including the enlarged selected area of the webpage of FIG. 7A. Referring to FIGS. 1 and 7B, it is relatively easier to identify information contained in the enlarged page compared to the webpage of FIG. 7A. When the user makes a touch for selecting a room type indicated by reference numeral 720 in the enlarged page, the processor 120 may recognize that one or more items configured to be displayed in the first area of the webpage are selected.

Figure 7C:
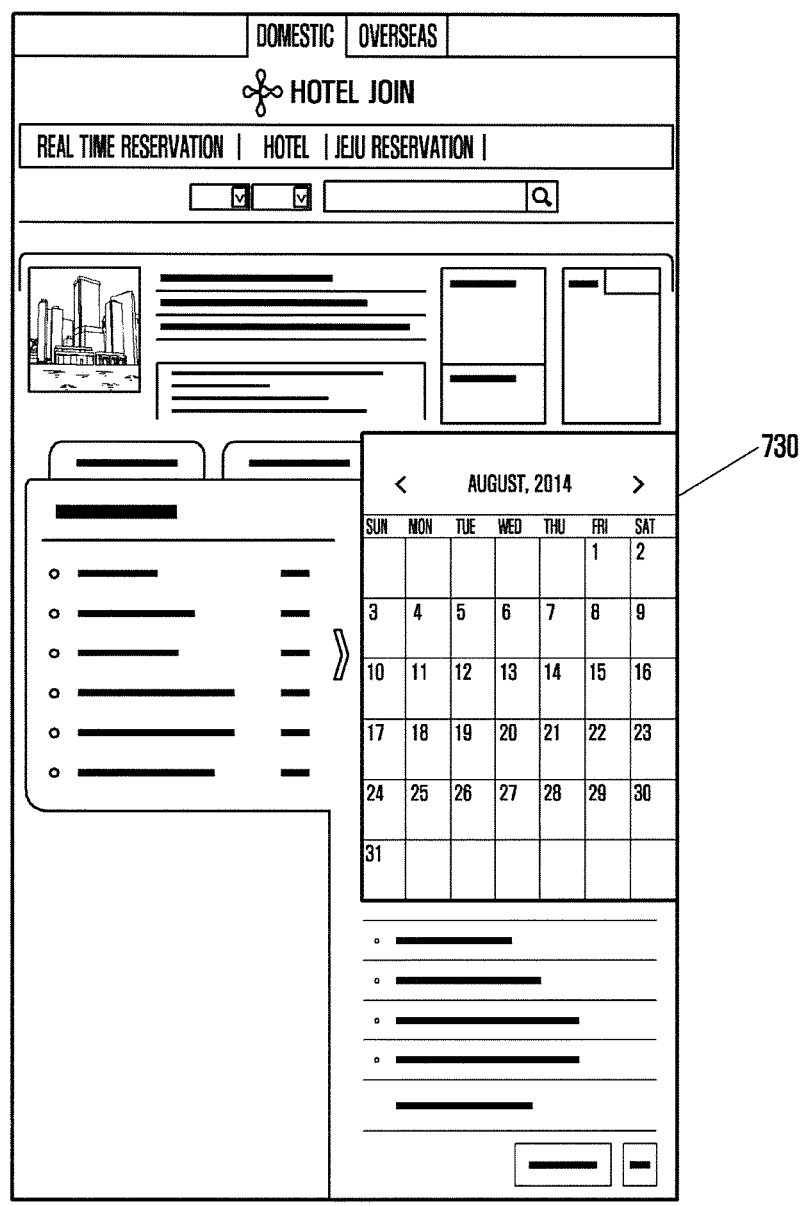

FIG. 7C illustrates an example in which the selected item is executed and displayed in the webpage of FIG. 7A. Referring to FIGS. 1 and 7C, the item selected in the webpage of FIG. 7A may be displayed as indicated by reference numeral 730. For example, when the room type is selected in FIG. 7B, a "calendar" indicated by reference numeral 730 for reserving a room of the selected room type appears in the webpage of FIG. 7A.

Figure 7D:
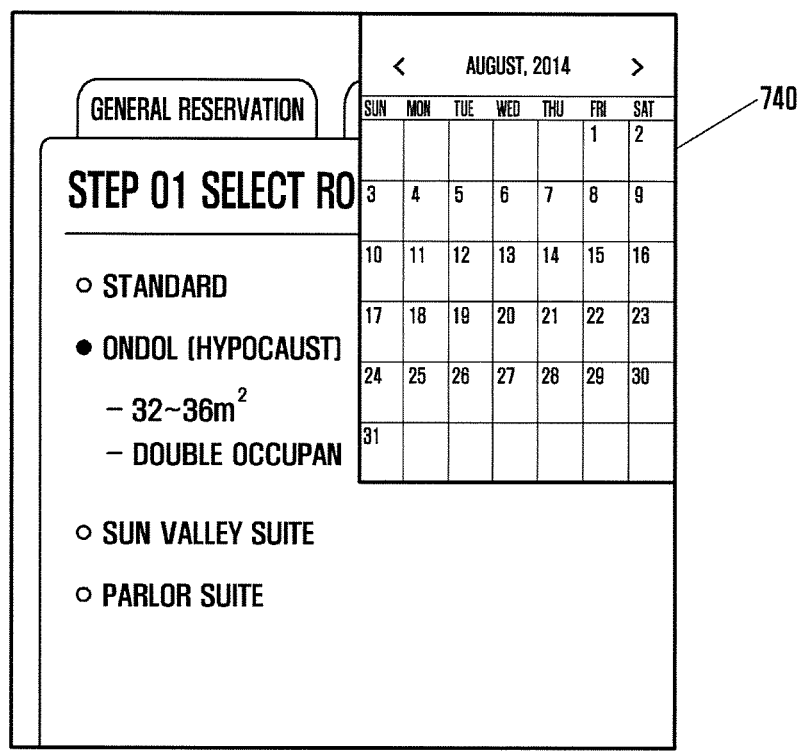

FIG. 7D illustrates an example of a way of informing that the date item appears in the enlarged page of FIG. 7B. Referring to FIGS. 1 and 7D, the date item is actually displayed in the webpage as illustrated in FIG. 7C. However, when a part of the webpage is enlarged and displayed on the display 160, the date item may not be displayed on the display 160. In this case, the processor 120 may overlay the part of the page enlarged from the webpage with the date item as indicated by reference numeral 740. According to various embodiments, the processor 120 may make an edge of the date item flicker or display the edge of the date item in blue, red, or the like.

FIGS. 8A to 8D illustrate an example of returning to a previous page according to an embodiment.

Figure 8A:
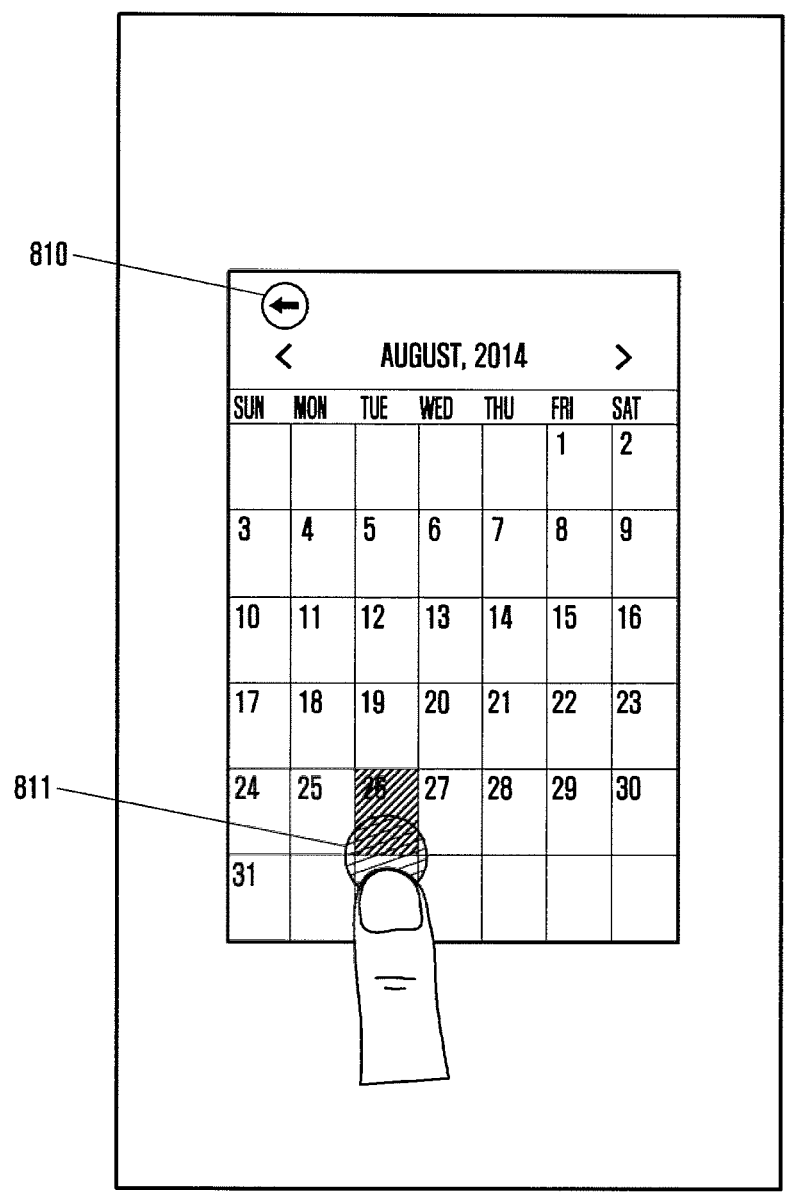

FIG. 8A illustrates an example of displaying the date item. Referring to FIGS. 1 and 8A, the processor 120 may display a control key for returning to the enlarged page indicated by reference numeral 810 together with the date item. When the control key 810 is selected, the processor 120 may return to the enlarged page and display the enlarged page illustrated in FIG. 7B. Further, the processor 120 may receive a selection of a particular date (for example, the 26th) in the date item as indicated by reference numeral 811.

Figure 8B:
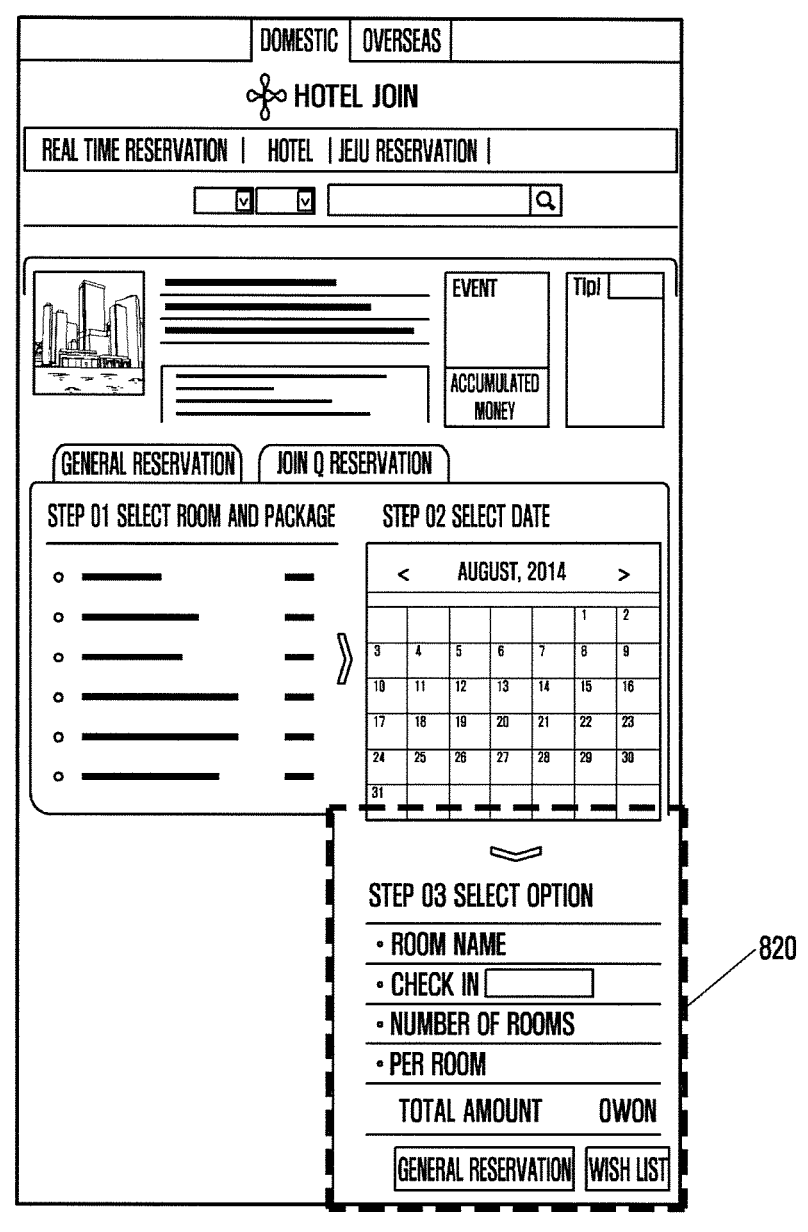

At this time, when another item appears in the left side due to the selection of the particular date, a return interaction that indicates the return to the previous screen may overlap an interaction that indicates the appearance of the other item in the left side. In this case, when a leftwards arrow 810 is selected, the processor 120 may receive a user's selection for determining whether to return to the enlarged page or display the other item. The processor 120 may return to the enlarged page or display the other item according to the user's selection. FIG. 8B illustrates a changed webpage according to the selection of the date in FIG. 8A. Referring to FIGS. 1 and 8A, when the particular date is selected in the calendar of FIG. 8A, the webpage may be a webpage displaying another item as indicated by reference numeral 820 according to the selection of the date. For example, when the webpage is a page related to the hotel reservation, if the particular date is selected in the date item of FIG. 8A, another item for selecting the number of rooms to be reserved on the particular date, the number of people, and whether to include breakfast may appear in the webpage of FIG. 8B.

However, the other item may be configured to be displayed in the first area of the contents. The processor 120 may display the other item in a second area different from the first area, or receive a user input or display guiding information to display the one or more items. When the other item is not displayed on the display 160, the processor 120 may display information guiding the appearance of the other item on the display 160.

Figure 8C:
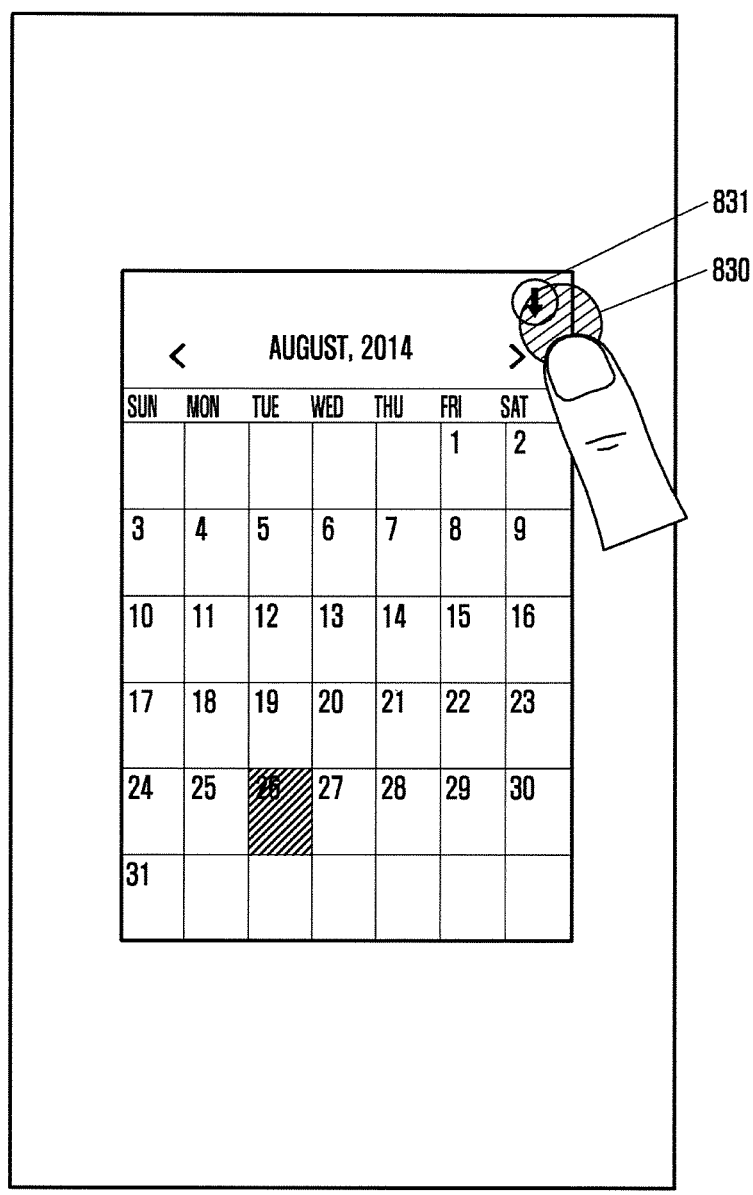

FIG. 8C illustrates an example of displaying as guide information a direction key 831 corresponding to a direction in which the other item appears. Referring to FIGS. 1 and 8C, when a date is selected in the date item of FIG. 8A, the processor 120 may display a direction key corresponding to a direction in which the other item appears as indicated by reference numeral 831. For example, when the other item appears below the date item, which is currently displayed, the processor 120 may display a downwards arrow indicated by reference numeral 831 as the direction key. When an input 830 for selecting the direction key is received from the user, the processor 120 may display the other item in the entire area of the display 160 as illustrated in FIG. 8D.

Figure 8D:
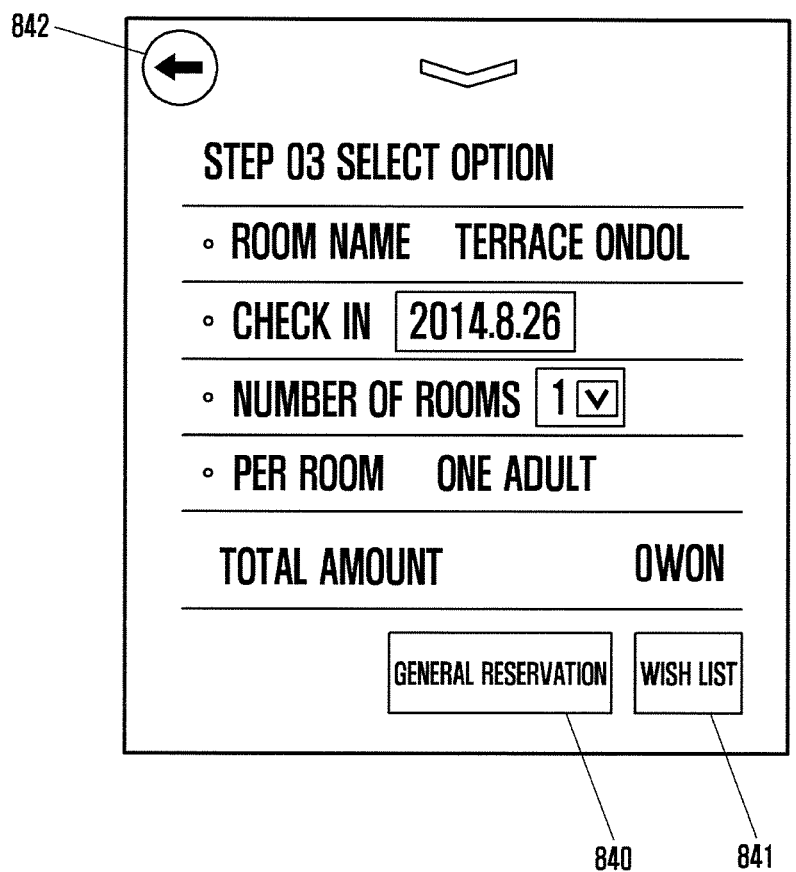

FIG. 8D illustrates an example of displaying the other item. Referring to FIGS. 1 and 8D, the processor 120 may display the other item for selecting the number of rooms, the number of people, and whether to include breakfast. At this time, the processor 120 may display a control key for returning to a previous page in the other item as indicated by reference numeral 842. In FIG. 8D, the previous page may be the page displaying the calendar as detailed information as illustrated in FIG. 8A. When the user selects the control key, the processor 120 may return to the screen displaying the calendar as illustrated in FIG. 8A. Further, when the user selects the items indicated by reference numeral 840 and reference numeral 841, the processor 120 may determine that the setting is completed. When the setting is completed, the processor 120 may return to the enlarged page.

Figure 9B:
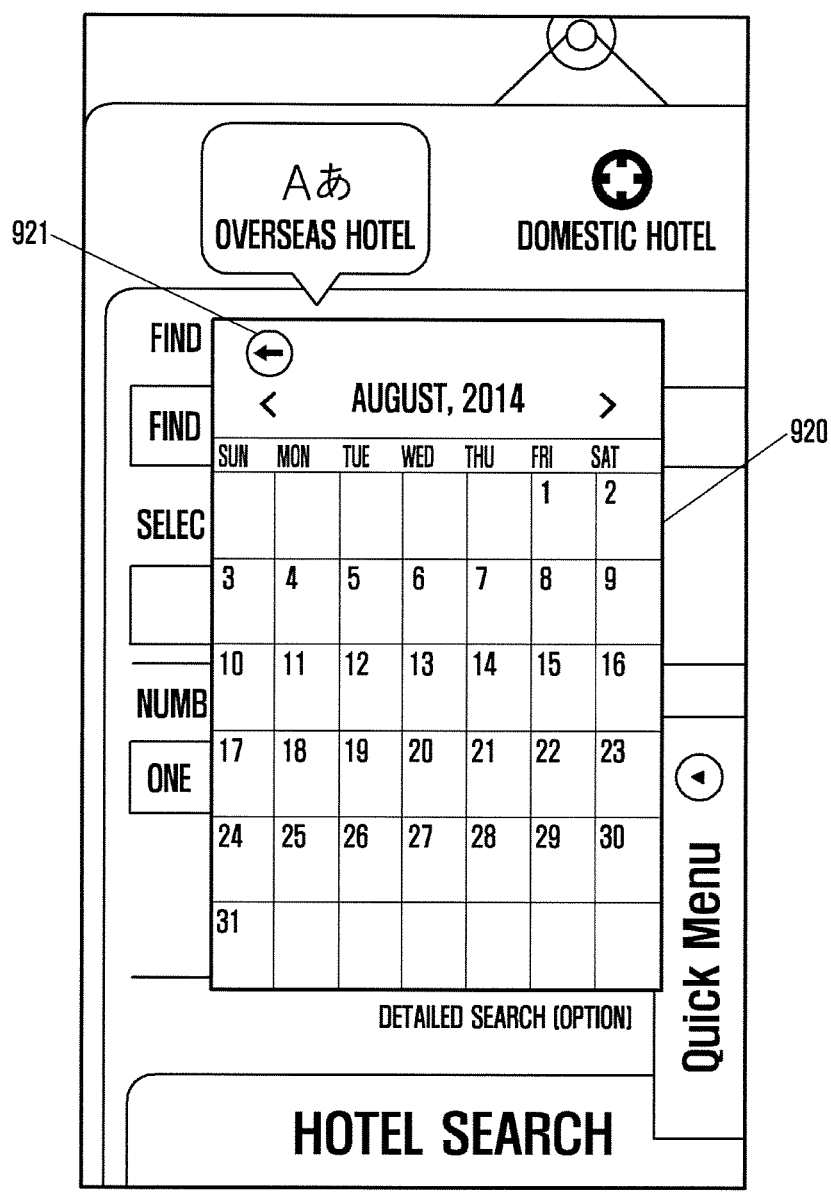

FIGS. 9A and 9B illustrates an example of automatically displaying one or more items according to various embodiments.

FIG. 9A illustrates an example of displaying a part of the item in a page enlarged from a webpage. Referring to FIGS. 1 and 9A, although a date item indicated by reference numeral 910 is executed and displayed according to a user input, the processor 120 may display only a part of the date item on the display 160 without displaying all of the date item on the display 160. In this case, the processor 120 may determine whether an area of the date item is larger than the reference area of the webpage and display all of the date item on the display 160. For example, when the area of the date item 910 is larger than the reference area of the webpage, the processor 120 may determine the date item as important information. Since only part of the date item 910 is displayed on the display 160 even though the date item 910 is important information, the processor 120 may generate a control to automatically overlay the enlarged page with the date item for the user's convenience.

FIG. 9B illustrates an example of overlaying the enlarged page with the date item. Referring to FIGS. 1 and 9B, when the part of the date item is displayed in the enlarged page, the processor 120 may automatically overlay the enlarged page with the date item indicated by reference numeral 920. The processor 120 may display a control key for returning to the enlarged page in the date item 920. The control key may be indicated by reference numeral 921.

Figure 10:
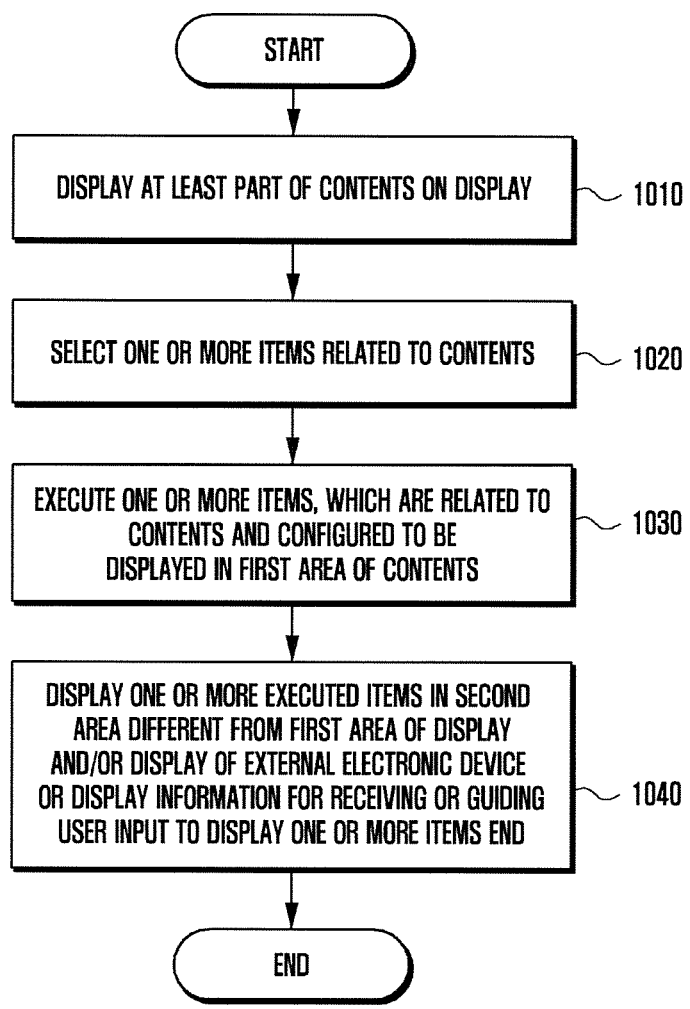
FIG. 10 illustrates a method of notifying of a content change in a multi-screen environment according to an embodiment of the present disclosure.

FIG. 10 illustrates a method of notifying of a content change in a multi-screen environment according to an embodiment. In the multi-screen environment of FIG. 10, the display may include a first display and a second display. For example, one electronic device may include both the first display and the second display, or one electronic device may include the first display and another electronic device may include the second display. Hereinafter, although it will be described as an example that two different electronic devices include displays, respectively, the multi-screen environment of the present disclosure is not limited to the performance in the two different electronic devices. A detailed description of a method of constructing the multi-screen environment in the two different electronic devices is omitted.

Hereinafter, for convenience of the description, one electronic device may be described as a first electronic device indicated by reference numeral 101 and the other electronic device may be described as a second electronic device indicated by reference numeral 102. Further, to avoid confusion, a display of the first electronic device may be referred to as a first display and a display of the second electronic device may be referred to as a second display.

Referring to FIGS. 1 to 10, in operation 1010, at least a part of the contents of the first electronic device 101 may be displayed on the first display. The contents are a concept including anything which can be displayed, for example, text, images, or dynamic images.

In operation 1020, the first electronic device 101 may receive a selection of one or more items associated with the contents. For example, the contents may be a webpage for reserving a hotel, and the one or more items may be for selecting a destination, a date, a room, a room type, and the like. For example, when the user makes a touch to select the "date" in the one or more items, the first electronic device 101 may recognize that the date item is selected.

In operation 1030, the first electronic device 101 may execute one or more items configured to be displayed in a first area of the contents in response to the selection.

In operation 1040, the first electronic device 101 may display the one or more executed items in the second area different from the first area on the first display and/or the second display of the second electronic device, or receive a user input or display guiding information to display the one or more items.

For example, the one or more executed items may be displayed on the first display and/or the second display. For example, the first display may display at least a part of the contents and the second display may display the one or more items. Alternatively, vice versa. Alternatively, when the one or more executed items are not displayed on the first display even though the one or more executed items should be displayed on the first display, the first electronic device 101 may receive a user input or display guiding information to display the items on the first display. Similarly, when the one or more executed items are not displayed on the second display even though the one or more executed items should be displayed on the second display, the second electronic device 102 may receive a user input or display guiding information to display the items on the second display.

Figure 11:
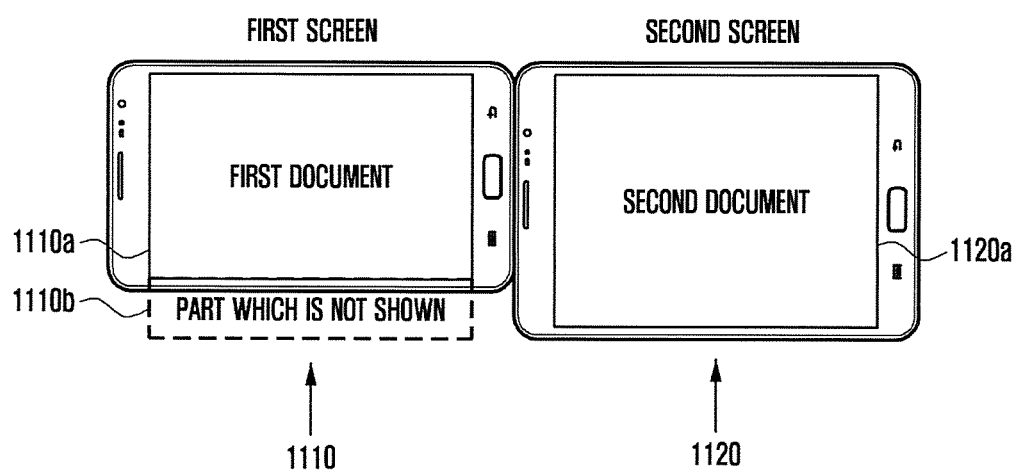
FIGS. 11 and 12 illustrate examples of notifying of a content change in a multi-screen environment according to various embodiments of the present disclosure.
Figure 12:
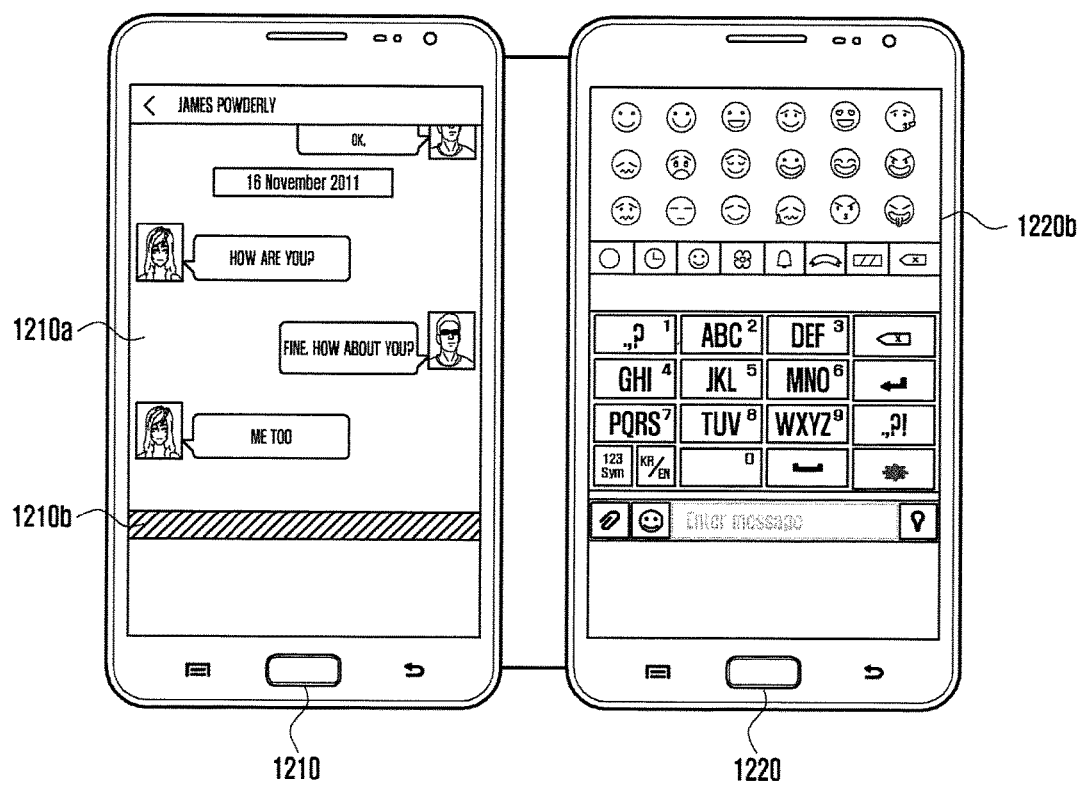

FIGS. 11 and 12 illustrate examples of notifying of a content change in a multi-screen environment according to various embodiments.

FIG. 11 illustrates an example in which one electronic device notifies of a content change in a multi-screen environment which has two displays. One electronic device may include a first display 1110 and a second display 1120. The first display 1110 may display at least a part of the contents indicated by reference numeral 1110a and the second display 1120 may display the remaining part of the contents indicated by reference numeral 1120a. One or more items, which are related to the contents and configured to be displayed in a first area of the contents, may be executed. The one or more items may be indicated by reference numeral 1110b, and the first display 1110 may not display the one or more executed items 1110b. In this case, the first display 1110 may receive a user input or display guiding information to display the one or more items. 1110b FIG. 12 illustrates an example in which two different electronic devices notify of a content change in a multi-screen. Reference numeral 1210 may indicate a first electronic device, and reference numeral 1220 may indicate a second electronic device. The first electronic device 1210 may display at least a part of the contents indicated by reference numeral 1210a and the second electronic device 1220 may display the remaining part of the contents indicated by reference numeral 1220b. One or more items, which are related to the contents and configured to be displayed in a first area of the contents, may be executed. However, the executed items may not be displayed in neither the first electronic device 1210 nor the second electronic device 1220. In this case, the first electronic device 1210 may display guiding information to display the executed items as indicated by reference numeral 1210b.

A method of notifying of a content change by an electronic device according to various embodiments may include: displaying at least a part of contents on a display; receiving a user input for displaying at least one item related to the contents; executing at least one item, which is related to the contents and configured to be displayed in a first area of the contents in response to the user input; and displaying the at least one executed item in a second area different from the first area of the display or display information for receiving or guiding a user input to display the at least one item.

The contents may include a webpage.

The item may be displayed within a popup window.

At least a part of the first area may not be displayed on the display while the part of the contents is displayed on the display.

The displaying of the information for receiving or guiding the user input may include overlapping the information for receiving or guiding the user input to display the at least one item with the displayed part of the contents on the display.

The at least one display may include a first display and a second display, and the displaying of at least the part of the contents on the display may include displaying at least the part of the contents on the first display and the displaying of the information for receiving or guiding the user input may include displaying the at least one executed item in a second area different from the first area of the first or second display or displaying information for receiving or guiding a user input to display the at least one item.

The displaying of the information for receiving or guiding the user input may include: communicating in a wireless or wired manner with an external electronic device that has a display; and displaying the at least one executed item in a second area different from the first area of the display of the electronic device and/or the display of the external electronic device or displaying information for receiving or guiding a user input to display the at least one item.

The guiding information may display on the contents a direction key corresponding to a direction, in which the at least one item appears.

The guiding information may display a side of the contents corresponding to a direction in which the item appears in such a way that is can be distinguished from the other sides.

The displaying of the at least one item may include, when an area of the at least one item is larger than a reference area of the contents, displaying the at least one item on all of the contents.

The displaying of the at least one item may include displaying the at least one item on all of the contents according to a setting of the electronic device.

The displaying of the at least one item may include, when an input for selecting the guiding information is received, displaying the at least one item on all of the contents.

The displaying of the at least one item may include generating a control to display the at least one item by applying a display ratio of the contents or controlling a coordinate value to place the at least one item in the center of the contents.

Although the present disclosure has been described with embodiments, various changes and modifications may be suggested to one skilled in the art. It is intended that the present disclosure encompass such changes and modifications as fall within the scope of the appended claims.

What is claimed is:

1. An electronic device comprising:
   a display;
   a memory; and
   a processor electrically connected to the display and memory, the processor configured to:
   display a first area of contents on the display,
   execute a first item that is related to the contents and configured to be displayed in a second area different from the first area of the contents,
   display a second item for displaying the first item on the display, by overlaying the second item on the first area of the contents, and
   in response to detecting an input on at least part of the second item, remove display of the second item and display the first item by overlaying the first item on the first area of the contents.

2. The electronic device of claim 1, wherein the contents include a webpage.

3. The electronic device of claim 1, wherein the first item is displayed within a popup window.

4. The electronic device of claim 1, wherein the second area is not displayed on the display in a state where the first area of the contents is displayed on the display.

5. The electronic device of claim 1, wherein the at least one display includes a first display and a second display, and the processor is further configured to:
   display a part of the first area of the contents on the first display,
   display the second item on the first display, by overlaying the second item on the first area of the contents,
   wherein the first item is configured to be displayed in the second area which is not displayed on the first display and the second display in a state where the first area is displayed on the first display.

6. The electronic device of claim 1, further comprising a communication module configured to communicate in at least one of a wireless or wired manner with an external electronic device that has a display,
   wherein the processor is further configured to:
   display the first area of the contents on the display,
   display the second item on the display, by overlaying the second item on the first area of the contents,
   wherein the first item is configured to be displayed in the second area which is not displayed on the display and the display of the external electronic device in a state where the first area is displayed on the display.

7. The electronic device of claim 1, wherein the second item includes a direction key corresponding to a direction in which the first item appears.

8. The electronic device of claim 1, wherein the second item is displayed in a side of the first area of the contents corresponding to a direction in which the first item appears, in such a way as to be distinguishable from other sides of the first area.

9. The electronic device of claim 1, wherein the processor is further configured to generate a control to display the first item on all of the contents when an area of the first item is larger than a reference area of the contents.

10. The electronic device of claim 1, wherein the processor is further configured to generate a control to display the first item on all of the contents according to a setting of the electronic device.

11. The electronic device of claim 1, wherein the processor is further configured to generate a control to display the first item on all of the contents when an input for selecting the second item is received.

12. The electronic device of claim 1, wherein the processor is further configured to at least one of:
   generate a control to display the first item by applying a display ratio of the contents, or
   control a coordinate value to place the first item in a center of the contents.

13. The electronic device of claim 1, wherein the processor is further configured to generate a control to display a control key for returning to the contents in the first item.

14. A method of notifying of a content change by an electronic device, the method comprising:
   displaying a first area of contents on a display of the electronic device;
   receiving a user input for displaying a first item related to the contents;
   in response to the user input, executing the first item that is related to the contents and configured to be displayed in a second area different from the first area of the contents;
   displaying a second item for displaying the first item on the display, by overlaying the second item on the first area of the contents; and
   in response to detecting an input on at least part of the second item, removing display of the second item and displaying the first item by overlaying the first item on the first area of the contents.

15. The method of claim 14, wherein the contents include a webpage.

16. The method of claim 14, wherein the first item is displayed within a popup window.

17. The method of claim 14, wherein the second area is not displayed on the display in a state where the first area of the contents is displayed on the display.

18. The method of claim 14, wherein:
   the electronic device includes a first display and a second display; and
   the first item is configured to be displayed in the second area which is not displayed on the first display and the second display in a state where the first area is displayed on the first display.

19. The method of claim 14, further comprising
   communicating in a wireless or wired manner with an external electronic device that has a display; and
   wherein the first item is configured to be displayed in the second area which is not displayed on the display of the electronic device and the display of the external electronic device in a state where the first area is displayed on the display.

20. The method of claim 14, wherein second item includes a direction key corresponding to a direction in which the first item appears.

21. The method of claim 14, wherein the second item is displayed in a side of the first area of the contents corresponding to a direction in which the first item appears in such a way as to be distinguishable from other sides of the first area.

22. The method of claim 14, wherein displaying the first item comprises:
when an area of the first item is larger than a reference area of the contents, displaying the first item on all of the contents.

23. The method of claim 14, wherein displaying the first item comprises displaying the first item on all of the contents according to a setting of the electronic device.

24. The method of claim 14, wherein displaying the first item comprises:
when an input for selecting the second item is received, displaying the first item on all of the contents.

25. The method of claim 14, wherein displaying the first item comprises at least one of:
generating a control to display the first item by applying a display ratio of the contents, or
controlling a coordinate value to place the first item in a center of the contents.

26. The method of claim 14, wherein displaying the first item comprises displaying a control key for returning to the contents in the second item.

* * * * *